US012773010B2

(12) United States Patent
Blandino et al.

(10) Patent No.: US 12,773,010 B2
(45) Date of Patent: Oct. 27, 2026

(54) ARTICLE FOR USE WITH APPARATUS FOR HEATING SMOKABLE MATERIAL

(71) Applicant: NICOVENTURES TRADING LIMITED, London (GB)

(72) Inventors: Thomas P. Blandino, Cottage Grove, WI (US); Andrew Wilke, Madison, WI (US)

(73) Assignee: NICOVENTURES TRADING LIMITED, London (GB)

( * ) Notice: Subject to any disclaimer, the term of this patent is extended or adjusted under 35 U.S.C. 154(b) by 28 days.

(21) Appl. No.: 18/302,917

(22) Filed: Apr. 19, 2023

(65) Prior Publication Data

US 2023/0263220 A1 Aug. 24, 2023

Related U.S. Application Data

(63) Continuation of application No. 15/754,823, filed as application No. PCT/EP2016/070188 on Aug. 26, (Continued)

(51) Int. Cl.
*A24F 40/465* (2020.01)
*A24F 40/00* (2020.01)
(Continued)

(52) U.S. Cl.
CPC .............. *A24F 40/42* (2020.01); *A24F 40/00* (2020.01); *A24F 40/46* (2020.01); *A24F 40/465* (2020.01); *H05B 6/36* (2013.01); *A24F 40/20* (2020.01)

(58) Field of Classification Search
CPC .......... A24F 40/00; A24F 40/20; A24F 40/36; A24F 40/42; A24F 40/46; A24F 40/465
(Continued)

(56) References Cited

U.S. PATENT DOCUMENTS 219,628 A 9/1879 Edison
219,634 A 9/1879 Gifford
(Continued)

FOREIGN PATENT DOCUMENTS

AT 262137 B 5/1968
AT 306224 B 3/1973
(Continued)

OTHER PUBLICATIONS

CN203952405 (Machine Translation) [online], [retrieved on Jul. 12, 2024], retrieved from Espacenet (https://worldwide.espacenet.com/) (Year: 2014).*
(Continued)

*Primary Examiner* — Philip Y Louie
*Assistant Examiner* — Yana B Krinker
(74) *Attorney, Agent, or Firm* — Merchant & Gould P.C.

(57) ABSTRACT

Disclosed is an article for use with apparatus for heating smokable material to volatilize at least one component of the smokable material. The article includes a cavity for receiving smokable material, and a coil of heating material that is heatable by penetration with a varying magnetic field to heat the cavity. Also disclosed is a system including the article and apparatus. The apparatus has an interface for cooperating with the article, and a magnetic field generator. The magnetic field generator includes a coil for generating a varying magnetic field for penetrating the coil of the article when the interface is cooperating with the article. An impedance of the coil of the magnetic field generator is equal, or substantially equal, to an impedance of the coil of the article.

20 Claims, 2 Drawing Sheets

Related U.S. Application Data 2016, now Pat. No. 11,659,863, which is a continuation of application No. 14/840,854, filed on Aug. 31, 2015, now abandoned.

(51) Int. Cl.

| | |
|---|---|
| ***A24F 40/42*** | (2020.01) |
| ***A24F 40/46*** | (2020.01) |
| ***H05B 6/36*** | (2006.01) |
| *A24F 40/20* | (2020.01) |

(58) Field of Classification Search
USPC .......................................................... 131/276
See application file for complete search history.

(56) References Cited

U.S. PATENT DOCUMENTS

| | | | |
|---|---|---|---|
| 219,635 | A | 9/1879 | Giles |
| 219,643 | A | 9/1879 | Mattoni |
| 844,272 | A | 2/1907 | Fate |
| 912,986 | A | 2/1909 | Aschenbrenner |
| 1,071,817 | A | 9/1913 | Stanley |
| 1,771,366 | A | 7/1930 | Wyss et al. |
| 1,886,391 | A | 11/1932 | Henri |
| 2,057,353 | A | 10/1936 | Whittemore, Jr. |
| 2,104,266 | A | 1/1938 | Mccormick |
| 2,462,563 | A | 2/1949 | Seyforth |
| 2,473,325 | A | 6/1949 | Aufiero |
| 2,689,150 | A | 9/1954 | Croce |
| 2,809,634 | A | 10/1957 | Hirotada |
| 2,888,208 | A | 5/1959 | Rene |
| 3,040,991 | A | 6/1962 | Rene |
| 3,043,524 | A | 7/1962 | Sonia |
| 3,111,396 | A | 11/1963 | Ball |
| 3,144,174 | A | 8/1964 | Henry |
| 3,225,954 | A | 12/1965 | Herrick et al. |
| 3,258,015 | A | 6/1966 | Drummond et al. |
| 3,265,236 | A | 8/1966 | Norman et al. |
| 3,289,949 | A | 12/1966 | Willy |
| 3,347,231 | A | 10/1967 | Chien-hshuing |
| 3,402,724 | A | 9/1968 | Blount et al. |
| 3,431,393 | A | 3/1969 | Katsuda |
| 3,433,632 | A | 3/1969 | Elbert et al. |
| 3,521,643 | A | 7/1970 | Toth |
| 3,522,806 | A | 8/1970 | Szekely |
| 3,604,428 | A | 9/1971 | Moukaddem |
| 3,647,143 | A | 3/1972 | Gauthier et al. |
| 3,658,059 | A | 4/1972 | Steil |
| 3,733,010 | A | 5/1973 | Riccio |
| 3,804,100 | A | 4/1974 | Fariello |
| 3,805,806 | A | 4/1974 | Grihalva |
| 3,856,185 | A | 12/1974 | Riccio |
| 3,864,326 | A | 2/1975 | Babington |
| 3,889,690 | A | 6/1975 | Guarnieri |
| 3,913,843 | A | 10/1975 | Cambio |
| 3,943,942 | A | 3/1976 | Anderson et al. |
| 3,964,902 | A | 6/1976 | Fletcher et al. |
| 4,009,713 | A | 3/1977 | Simmons et al. |
| 4,017,701 | A | 4/1977 | Mittelmann |
| 4,031,906 | A | 6/1977 | Knapp |
| 4,094,119 | A | 6/1978 | Sullivan |
| 4,145,001 | A | 3/1979 | Weyenberg et al. |
| 4,149,548 | A | 4/1979 | Bradshaw |
| 4,161,283 | A | 7/1979 | Hyman |
| 4,171,000 | A | 10/1979 | Uhle |
| 4,193,513 | A | 3/1980 | Bull |
| 4,284,089 | A | 8/1981 | Ray |
| 4,299,274 | A | 11/1981 | Campbell |
| 4,299,355 | A | 11/1981 | Haekkinen |
| 4,303,083 | A | 12/1981 | Burruss |
| 4,303,541 | A | 12/1981 | Wasel-nielen et al. |
| 4,393,884 | A | 7/1983 | Jacobs |
| 4,412,930 | A | 11/1983 | Koike et al. |
| 4,427,123 | A | 1/1984 | Komeda et al. |
| 4,429,835 | A | 2/1984 | Brugger et al. |
| 4,474,191 | A | 10/1984 | Steiner |
| 4,503,851 | A | 3/1985 | Braunroth |
| 4,588,976 | A | 5/1986 | Jaselli |
| 4,628,187 | A | 12/1986 | Sekiguchi et al. |
| 4,638,820 | A | 1/1987 | Roberts et al. |
| 4,675,508 | A | 6/1987 | Miyaji et al. |
| 4,676,237 | A | 6/1987 | Wood et al. |
| 4,677,992 | A | 7/1987 | Bliznak |
| 4,694,841 | A | 9/1987 | Esparza |
| 4,734,097 | A | 3/1988 | Tanabe et al. |
| 4,735,217 | A | 4/1988 | Gerth et al. |
| 4,746,067 | A | 5/1988 | Svoboda |
| 4,756,318 | A | 7/1988 | Clearman et al. |
| 4,765,347 | A | 8/1988 | Sensabaugh et al. |
| 4,765,348 | A | 8/1988 | Honeycutt |
| 4,771,795 | A | 9/1988 | White et al. |
| 4,776,353 | A | 10/1988 | Lilja et al. |
| 4,819,665 | A | 4/1989 | Roberts et al. |
| 4,827,950 | A | 5/1989 | Banerjee et al. |
| 4,830,028 | A | 5/1989 | Lawson et al. |
| 4,848,374 | A | 7/1989 | Chard et al. |
| 4,885,129 | A | 12/1989 | Leonard et al. |
| 4,892,109 | A | 1/1990 | Strubel |
| 4,907,606 | A | 3/1990 | Lilja et al. |
| 4,913,168 | A | 4/1990 | Potter et al. |
| 4,917,119 | A | 4/1990 | Potter et al. |
| 4,917,120 | A | 4/1990 | Hill |
| 4,917,301 | A | 4/1990 | Munteanu |
| 4,922,901 | A | 5/1990 | Brooks et al. |
| 4,924,883 | A | 5/1990 | Perfetti et al. |
| 4,938,236 | A | 7/1990 | Banerjee et al. |
| 4,941,483 | A | 7/1990 | Ridings et al. |
| 4,945,929 | A | 8/1990 | Egilmex |
| 4,945,931 | A | 8/1990 | Gori |
| 4,947,874 | A | 8/1990 | Brooks et al. |
| 4,947,875 | A | 8/1990 | Brooks et al. |
| 4,955,399 | A | 9/1990 | Potter et al. |
| 4,978,814 | A | 12/1990 | Honour |
| 4,979,521 | A | 12/1990 | Davis et al. |
| 4,987,291 | A | 1/1991 | Mcgaffigan et al. |
| 4,991,606 | A | 2/1991 | Serrano et al. |
| 5,019,122 | A | 5/1991 | Clearman et al. |
| 5,020,509 | A | 6/1991 | Suzuki et al. |
| 5,027,837 | A | 7/1991 | Clearman et al. |
| 5,040,551 | A | 8/1991 | Schlatter et al. |
| 5,040,552 | A | 8/1991 | Schleich et al. |
| 5,042,509 | A | 8/1991 | Banerjee et al. |
| 5,046,514 | A | 9/1991 | Bolt |
| 5,060,667 | A | 10/1991 | Strubel |
| 5,060,671 | A | 10/1991 | Counts et al. |
| 5,076,292 | A | 12/1991 | Sensabaugh et al. |
| 5,080,115 | A | 1/1992 | Templeton |
| 5,093,894 | A | 3/1992 | Deevi et al. |
| 5,095,647 | A | 3/1992 | Zobele et al. |
| 5,095,921 | A | 3/1992 | Losee et al. |
| 5,096,921 | A | 3/1992 | Bollinger et al. |
| 5,097,850 | A | 3/1992 | Braunshteyn et al. |
| 5,099,861 | A | 3/1992 | Clearman et al. |
| 5,105,831 | A | 4/1992 | Banerjee et al. |
| 5,119,834 | A | 6/1992 | Shannon et al. |
| 5,121,881 | A | 6/1992 | Lembeck |
| 5,129,409 | A | 7/1992 | White et al. |
| 5,133,368 | A | 7/1992 | Neumann et al. |
| 5,143,048 | A | 9/1992 | Cheney |
| 5,144,962 | A | 9/1992 | Counts et al. |
| 5,146,934 | A | 9/1992 | Deevi et al. |
| 5,159,940 | A | 11/1992 | Hayward et al. |
| 5,167,242 | A | 12/1992 | Turner et al. |
| 5,179,966 | A | 1/1993 | Losee et al. |
| 5,188,130 | A | 2/1993 | Hajaligol et al. |
| 5,190,060 | A | 3/1993 | Gerding et al. |
| 5,203,355 | A | 4/1993 | Clearman et al. |
| 5,224,498 | A | 7/1993 | Deevi et al. |
| 5,230,715 | A | 7/1993 | Iizuna et al. |
| 5,235,992 | A | 8/1993 | Sensabaugh |
| 5,247,947 | A | 9/1993 | Clearman et al. |
| 5,249,586 | A | 10/1993 | Morgan et al. |
| 5,251,688 | A | 10/1993 | Schatz |
| 5,261,424 | A | 11/1993 | Sprinkel |

(56) References Cited

U.S. PATENT DOCUMENTS 5,269,327 A 12/1993 Counts et al.
5,271,980 A 12/1993 Bell
5,272,216 A 12/1993 Clark et al.
5,285,798 A 2/1994 Banerjee et al.
5,293,883 A 3/1994 Edwards
5,303,720 A 4/1994 Banerjee et al.
5,305,733 A 4/1994 Walters
5,312,046 A 5/1994 Knoch et al.
5,322,075 A 6/1994 Deevi et al.
5,327,915 A 7/1994 Porenski et al.
5,331,979 A 7/1994 Henley
5,345,951 A 9/1994 Serrano et al.
5,353,813 A 10/1994 Deevi et al.
5,357,984 A 10/1994 Farrier et al.
5,369,723 A 11/1994 Counts et al.
5,372,148 A 12/1994 Mccafferty et al.
5,388,574 A 2/1995 Ingebrethsen
5,388,594 A 2/1995 Counts et al.
5,390,864 A 2/1995 Alexander
5,396,911 A 3/1995 Casey et al.
5,400,808 A 3/1995 Turner et al.
5,402,803 A 4/1995 Takagi
5,408,073 A 4/1995 Jeong
5,408,574 A 4/1995 Deevi et al.
5,412,183 A 5/1995 Buffenoir et al.
5,415,186 A 5/1995 Casey et al.
5,434,388 A 7/1995 Kralik et al.
5,443,560 A 8/1995 Deevi et al.
5,454,363 A 10/1995 Sata
5,461,695 A 10/1995 Knoch
5,468,936 A 11/1995 Deevi et al.
5,474,059 A 12/1995 Cooper
5,479,948 A 1/1996 Counts et al.
5,483,953 A 1/1996 Cooper
5,497,792 A 3/1996 Prasad et al.
5,499,636 A 3/1996 Baggett et al.
5,500,511 A 3/1996 Hansen et al.
5,501,236 A 3/1996 Hill et al.
5,502,743 A 3/1996 Conochie et al.
5,505,214 A 4/1996 Collins et al.
5,511,538 A 4/1996 Haber et al.
5,517,981 A 5/1996 Taub et al.
5,530,225 A 6/1996 Hajaligol
5,534,020 A 7/1996 Cheney et al.
5,538,020 A 7/1996 Farrier et al.
5,540,241 A 7/1996 Kim
5,549,906 A 8/1996 Santus
5,553,791 A 9/1996 Alexander
5,564,442 A 10/1996 Macdonald et al.
5,573,140 A 11/1996 Satomi et al.
5,573,692 A 11/1996 Das et al.
5,591,368 A 1/1997 Fleischhauer et al.
5,593,792 A 1/1997 Farrier et al.
5,613,504 A 3/1997 Collins et al.
5,613,505 A 3/1997 Campbell et al.
5,636,787 A 6/1997 Gowhari
5,645,749 A 7/1997 Wang
5,649,554 A 7/1997 Sprinkel et al.
5,659,656 A 8/1997 Das
5,665,262 A 9/1997 Hajaligol et al.
5,666,977 A 9/1997 Higgins et al.
5,687,912 A 11/1997 Denyer
5,692,291 A 12/1997 Deevi et al.
5,699,786 A 12/1997 Oshima et al.
5,711,292 A 1/1998 Hammarlund
5,726,421 A 3/1998 Fleischhauer et al.
5,736,110 A 4/1998 Angelillo et al.
5,742,251 A 4/1998 Gerber
5,743,251 A 4/1998 Howell et al.
5,771,845 A 6/1998 Pistien et al.
5,778,899 A 7/1998 Saito et al.
5,798,154 A 8/1998 Bryan
5,808,281 A 9/1998 Matsen et al.
5,837,088 A 11/1998 Palmgren et al.
5,845,649 A 12/1998 Saito et al.
5,865,185 A 2/1999 Collins et al.
5,865,186 A 2/1999 Volsey
5,878,752 A 3/1999 Adams et al.
5,902,501 A 5/1999 Nunnally et al.
5,921,233 A 7/1999 Gold et al.
5,935,486 A 8/1999 Bell et al.
5,938,125 A 8/1999 Ritsche et al.
5,958,273 A 9/1999 Koch et al.
5,984,953 A 11/1999 Sabin et al.
6,000,394 A 12/1999 Blaha-schnabel et al.
6,026,820 A 2/2000 Baggett et al.
6,037,568 A 3/2000 Hatanaka et al.
6,040,560 A 3/2000 Fleischhauer et al.
6,041,790 A 3/2000 Smith et al.
6,053,176 A 4/2000 Adams et al.
6,058,711 A 5/2000 Maciaszek et al.
6,079,405 A 6/2000 Justo
6,085,741 A 7/2000 Becker
6,089,857 A 7/2000 Matsuura et al.
6,095,505 A 8/2000 Miller
6,113,078 A 9/2000 Rock
6,116,231 A 9/2000 Sabin et al.
6,125,853 A 10/2000 Susa et al.
6,129,080 A 10/2000 Pitcher et al.
6,155,268 A 12/2000 Takeuchi
6,158,676 A 12/2000 Hughes
6,164,287 A 12/2000 White
6,178,963 B1 1/2001 Baik
6,209,457 B1 4/2001 Kenworthy et al.
6,223,745 B1 5/2001 Hammarlund et al.
6,224,179 B1 5/2001 Wenning et al.
6,230,703 B1 5/2001 Bono
6,234,459 B1 5/2001 Rock
6,244,573 B1 6/2001 Rock
6,248,257 B1 6/2001 Bell et al.
6,267,110 B1 7/2001 Tenenboum et al.
6,275,650 B1 8/2001 Lambert
6,283,116 B1 9/2001 Yang
6,289,889 B1 9/2001 Bell et al.
6,297,483 B2 10/2001 Sadahira et al.
6,315,366 B1 11/2001 Post et al.
6,347,789 B1 2/2002 Rock
6,376,816 B2 4/2002 Cooper et al.
6,427,878 B1 8/2002 Greiner-perth et al.
6,595,209 B1 7/2003 Rose et al.
6,598,607 B2 7/2003 Adiga et al.
6,644,383 B2 11/2003 Joseph et al.
6,648,306 B2 11/2003 Rock
6,652,804 B1 11/2003 Neumann et al.
6,669,176 B2 12/2003 Rock
6,681,998 B2 1/2004 Sharpe et al.
6,701,921 B2 3/2004 Sprinkel et al.
6,708,846 B1 3/2004 Fuchs et al.
6,723,115 B1 4/2004 Daly
6,761,164 B2 7/2004 Amirpour et al.
6,769,436 B2 8/2004 Horian
6,790,496 B1 9/2004 Levander et al.
6,799,572 B2 10/2004 Nichols et al.
6,803,545 B2 10/2004 Blake et al.
6,803,550 B2 10/2004 Sharpe et al.
6,827,080 B2 12/2004 Fish et al.
6,868,230 B2 3/2005 Gerhardinger
6,886,556 B2 5/2005 Fuchs
6,953,474 B2 10/2005 Lu
6,968,888 B2 11/2005 Kolowich
6,994,096 B2 2/2006 Rostami et al.
7,012,227 B2 3/2006 Tathgur et al.
7,041,123 B2 5/2006 Stapf et al.
7,077,130 B2 7/2006 Nichols et al.
7,081,211 B2 7/2006 Li et al.
7,088,914 B2 8/2006 Whittle et al.
7,100,618 B2 9/2006 Dominguez
7,112,712 B1 9/2006 Ancell
7,163,014 B2 1/2007 Nichols et al.
7,185,659 B2 3/2007 Sharpe
7,234,459 B2 6/2007 Del
7,235,187 B2 6/2007 Li et al.
7,263,282 B2 8/2007 Meyer
7,290,549 B2 11/2007 Banerjee et al.

(56) References Cited

U.S. PATENT DOCUMENTS

| | | | |
|---|---|---|---|
| 7,303,328 | B2 | 12/2007 | Faraldi et al. |
| 7,335,186 | B2 | 2/2008 | Oneil |
| 7,373,938 | B2 | 5/2008 | Nichols et al. |
| 7,374,063 | B2 | 5/2008 | Reid |
| 7,400,940 | B2 | 7/2008 | Mcrae et al. |
| 7,434,584 | B2 | 10/2008 | Steinberg |
| 7,458,374 | B2 | 12/2008 | Hale et al. |
| 7,540,286 | B2 | 6/2009 | Cross et al. |
| 7,581,540 | B2 | 9/2009 | Hale et al. |
| 7,581,718 | B1 | 9/2009 | Chang |
| 7,585,493 | B2 | 9/2009 | Hale et al. |
| 7,624,739 | B2 | 12/2009 | Snaidr et al. |
| 7,645,442 | B2 | 1/2010 | Hale et al. |
| 7,665,461 | B2 | 2/2010 | Zierenberg et al. |
| 7,726,320 | B2 | 6/2010 | Robinson et al. |
| 7,767,698 | B2 | 8/2010 | Warchol et al. |
| 7,832,397 | B2 | 11/2010 | Lipowicz |
| 7,832,410 | B2 | 11/2010 | Hon |
| 7,834,295 | B2 | 11/2010 | Sharma et al. |
| 7,913,688 | B2 | 3/2011 | Cross et al. |
| 7,987,846 | B2 | 8/2011 | Hale et al. |
| 7,992,554 | B2 | 8/2011 | Radomski et al. |
| 8,061,361 | B2 | 11/2011 | Maeder et al. |
| 8,079,371 | B2 | 12/2011 | Robinson et al. |
| 8,081,474 | B1 | 12/2011 | Zohni et al. |
| 8,118,021 | B2 | 2/2012 | Cho et al. |
| 8,156,944 | B2 | 4/2012 | Han |
| 8,342,184 | B2 | 1/2013 | Inagaki et al. |
| 8,365,742 | B2 | 2/2013 | Hon |
| 8,375,957 | B2 | 2/2013 | Hon |
| 8,393,331 | B2 | 3/2013 | Hon |
| 8,402,976 | B2 | 3/2013 | Fernando et al. |
| 8,430,106 | B2 | 4/2013 | Potter et al. |
| 8,439,046 | B2 | 5/2013 | Peters et al. |
| 8,459,271 | B2 | 6/2013 | Inagaki |
| 8,490,628 | B2 | 7/2013 | Hon |
| 8,511,318 | B2 | 8/2013 | Hon |
| 8,678,013 | B2 | 3/2014 | Crooks et al. |
| 8,689,804 | B2 | 4/2014 | Fernando et al. |
| 8,689,805 | B2 | 4/2014 | Hon |
| 8,701,682 | B2 | 4/2014 | Sherwood et al. |
| 8,707,967 | B2 | 4/2014 | Li et al. |
| 8,752,545 | B2 | 6/2014 | Buchberger |
| 8,757,404 | B1 | 6/2014 | Fleckenstein |
| 8,807,140 | B1 | 8/2014 | Scatterday |
| 8,833,364 | B2 | 9/2014 | Buchberger |
| 8,899,238 | B2 | 12/2014 | Robinson et al. |
| 8,948,578 | B2 | 2/2015 | Buchberger |
| 9,060,388 | B2 | 6/2015 | Liu |
| 9,084,440 | B2 | 7/2015 | Zuber et al. |
| 9,125,437 | B2 | 9/2015 | Kaljura |
| 9,302,522 | B2 | 4/2016 | Sherwood et al. |
| 9,357,803 | B2 | 6/2016 | Egoyants et al. |
| 9,414,619 | B2 | 8/2016 | Sizer et al. |
| 9,414,629 | B2 | 8/2016 | Egoyants et al. |
| 9,439,454 | B2 | 9/2016 | Fernando et al. |
| 9,554,598 | B2 | 1/2017 | Egoyants et al. |
| 9,609,894 | B2 | 4/2017 | Abramov et al. |
| 9,623,205 | B2 | 4/2017 | Buchberger |
| 9,668,516 | B2 | 6/2017 | Sherwood et al. |
| 9,693,587 | B2 | 7/2017 | Plojoux et al. |
| 9,955,726 | B2 | 5/2018 | Brinkley et al. |
| 9,980,523 | B2 | 5/2018 | Abramov et al. |
| 9,999,256 | B2 | 6/2018 | Abramov et al. |
| 10,010,695 | B2 | 7/2018 | Buchberger |
| 10,045,562 | B2 | 8/2018 | Buchberger |
| 10,130,121 | B2 | 11/2018 | Plojoux et al. |
| 10,130,780 | B2 | 11/2018 | Talon |
| 10,524,516 | B2 | 1/2020 | Alelov |
| 10,588,337 | B2 | 3/2020 | Prestia et al. |
| 10,881,138 | B2 | 1/2021 | Saleem et al. |
| 10,881,141 | B2 | 1/2021 | Fraser et al. |
| 2001/0042546 | A1 | 11/2001 | Umeda et al. |
| 2001/0042927 | A1 | 11/2001 | Rock |
| 2001/0045424 | A1 | 11/2001 | Cooper |
| 2001/0054421 | A1 | 12/2001 | Jaser et al. |
| 2002/0005207 | A1 | 1/2002 | Wrenn et al. |
| 2002/0016370 | A1 | 2/2002 | Shytle et al. |
| 2002/0043260 | A1 | 4/2002 | Layer et al. |
| 2002/0078951 | A1 | 6/2002 | Nichols et al. |
| 2002/0078955 | A1 | 6/2002 | Nichols et al. |
| 2002/0078956 | A1 | 6/2002 | Sharpe et al. |
| 2002/0079309 | A1 | 6/2002 | Cox et al. |
| 2002/0079377 | A1 | 6/2002 | Nichols |
| 2002/0089072 | A1 | 7/2002 | Rock |
| 2002/0121624 | A1 | 9/2002 | Usui |
| 2002/0170666 | A1 | 11/2002 | Tathgur et al. |
| 2003/0005620 | A1 | 1/2003 | Ananth et al. |
| 2003/0007887 | A1 | 1/2003 | Roumpos et al. |
| 2003/0049025 | A1 | 3/2003 | Neumann et al. |
| 2003/0052196 | A1 | 3/2003 | Fuchs |
| 2003/0079309 | A1 | 5/2003 | Vandenbelt et al. |
| 2003/0097164 | A1 | 5/2003 | Stapf et al. |
| 2003/0101984 | A1 | 6/2003 | Li et al. |
| 2003/0105192 | A1 | 6/2003 | Li et al. |
| 2003/0106551 | A1 | 6/2003 | Sprinkel et al. |
| 2003/0106552 | A1 | 6/2003 | Sprinkel et al. |
| 2003/0108342 | A1 | 6/2003 | Sherwood et al. |
| 2003/0111637 | A1 | 6/2003 | Li et al. |
| 2003/0146224 | A1 | 8/2003 | Fujii et al. |
| 2003/0159702 | A1 | 8/2003 | Lindell et al. |
| 2003/0200964 | A1 | 10/2003 | Blakley et al. |
| 2003/0202169 | A1 | 10/2003 | Liu |
| 2003/0209240 | A1 | 11/2003 | Hale et al. |
| 2003/0217750 | A1 | 11/2003 | Amirpour et al. |
| 2003/0226837 | A1 | 12/2003 | Blake et al. |
| 2003/0230567 | A1 | 12/2003 | Centanni et al. |
| 2004/0003820 | A1 | 1/2004 | Iannuzzi |
| 2004/0031485 | A1 | 2/2004 | Rustad et al. |
| 2004/0031495 | A1 | 2/2004 | Steinberg |
| 2004/0065314 | A1 | 4/2004 | Layer et al. |
| 2004/0068222 | A1 | 4/2004 | Brian |
| 2004/0083755 | A1 | 5/2004 | Kolowich |
| 2004/0096204 | A1 | 5/2004 | Gerhardinger |
| 2004/0129793 | A1 | 7/2004 | Nguyen et al. |
| 2004/0149296 | A1 | 8/2004 | Rostami et al. |
| 2004/0149297 | A1 | 8/2004 | Sharpe |
| 2004/0149737 | A1 | 8/2004 | Sharpe et al. |
| 2004/0177849 | A1 | 9/2004 | Del |
| 2004/0210151 | A1 | 10/2004 | Tsukashima et al. |
| 2004/0226568 | A1 | 11/2004 | Takeuchi et al. |
| 2004/0234699 | A1 | 11/2004 | Hale et al. |
| 2004/0234914 | A1 | 11/2004 | Hale et al. |
| 2004/0234916 | A1 | 11/2004 | Hale et al. |
| 2004/0255941 | A1 | 12/2004 | Nichols et al. |
| 2004/0261782 | A1 | 12/2004 | Furumichi et al. |
| 2005/0007870 | A1 | 1/2005 | Faraldi et al. |
| 2005/0016549 | A1 | 1/2005 | Banerjee et al. |
| 2005/0025213 | A1 | 2/2005 | Parks |
| 2005/0031798 | A1 | 2/2005 | Tathgur et al. |
| 2005/0045193 | A1 | 3/2005 | Yang |
| 2005/0063686 | A1 | 3/2005 | Whittle et al. |
| 2005/0066735 | A1 | 3/2005 | Beavis et al. |
| 2005/0079166 | A1 | 4/2005 | Damani et al. |
| 2005/0098187 | A1 | 5/2005 | Grierson et al. |
| 2005/0133029 | A1 | 6/2005 | Nichols et al. |
| 2005/0145260 | A1 | 7/2005 | Inagaki et al. |
| 2005/0194013 | A1 | 9/2005 | Wright |
| 2005/0196345 | A1 | 9/2005 | Diederichs et al. |
| 2005/0204799 | A1 | 9/2005 | Koch |
| 2005/0211711 | A1 | 9/2005 | Reid |
| 2005/0236006 | A1 | 10/2005 | Cowan |
| 2005/0268911 | A1 | 12/2005 | Cross et al. |
| 2006/0027233 | A1 | 2/2006 | Zierenberg et al. |
| 2006/0032501 | A1 | 2/2006 | Hale et al. |
| 2006/0043067 | A1 | 3/2006 | Kadkhodayan et al. |
| 2006/0078477 | A1 | 4/2006 | Althouse et al. |
| 2006/0102175 | A1 | 5/2006 | Nelson |
| 2006/0118128 | A1 | 6/2006 | Hoffmann et al. |
| 2006/0137681 | A1 | 6/2006 | Von et al. |
| 2006/0191546 | A1 | 8/2006 | Takano et al. |
| 2006/0196518 | A1 | 9/2006 | Hon |
| 2006/0196885 | A1 | 9/2006 | Leach et al. |
| 2006/0249508 | A1 | 11/2006 | Teufl et al. |

(56) References Cited

U.S. PATENT DOCUMENTS

2006/0255029 A1 11/2006 Bone
2007/0014549 A1 1/2007 Demarest et al.
2007/0023043 A1 2/2007 Von et al.
2007/0028916 A1 2/2007 Hale et al.
2007/0031340 A1 2/2007 Hale et al.
2007/0045288 A1 3/2007 Nelson
2007/0062548 A1 3/2007 Horstmann et al.
2007/0074734 A1 4/2007 Braunshteyn et al.
2007/0102013 A1 5/2007 Adams et al.
2007/0102533 A1 5/2007 Rosell et al.
2007/0107879 A1 5/2007 Radomski et al.
2007/0125362 A1 6/2007 Ford et al.
2007/0131219 A1 6/2007 Ford et al.
2007/0138207 A1 6/2007 Bonney et al.
2007/0155255 A1 7/2007 Galauner et al.
2007/0175476 A1 8/2007 Lipowicz
2007/0204858 A1 9/2007 Abelbeck
2007/0204864 A1 9/2007 Grychowski et al.
2007/0204868 A1 9/2007 Bollinger et al.
2007/0222112 A1 9/2007 Christ et al.
2007/0235046 A1 10/2007 Gedevanishvili
2007/0267407 A1 11/2007 Loveless et al.
2007/0279377 A1 12/2007 Hillis et al.
2007/0283972 A1 12/2007 Monsees et al.
2007/0289720 A1 12/2007 Sunol et al.
2008/0027694 A1 1/2008 Gitman
2008/0031267 A1 2/2008 Imao
2008/0038363 A1 2/2008 Zaffaroni et al.
2008/0085139 A1 4/2008 Roof
2008/0092912 A1 4/2008 Robinson et al.
2008/0149118 A1 6/2008 Oglesby et al.
2008/0149622 A1 6/2008 Weiss et al.
2008/0156326 A1 7/2008 Belcastro et al.
2008/0216828 A1 9/2008 Wensley et al.
2008/0233318 A1 9/2008 Coyle
2008/0241255 A1 10/2008 Rose et al.
2008/0257367 A1 10/2008 Paterno et al.
2008/0276947 A1 11/2008 Martzel
2008/0302374 A1 12/2008 Wengert et al.
2008/0312674 A1 12/2008 Chen et al.
2009/0015717 A1 1/2009 Arnao et al.
2009/0032034 A1 2/2009 Steinberg
2009/0056728 A1 3/2009 Baker
2009/0065011 A1 3/2009 Maeder et al.
2009/0071477 A1 3/2009 Hale et al.
2009/0078711 A1 3/2009 Farone et al.
2009/0090349 A1 4/2009 Donovan
2009/0090351 A1 4/2009 Sunol et al.
2009/0090472 A1 4/2009 Radomski
2009/0095287 A1 4/2009 Emarlou
2009/0095311 A1 4/2009 Han
2009/0107492 A1 4/2009 Ooida
2009/0114215 A1 5/2009 Spallek et al.
2009/0126745 A1 5/2009 Hon
2009/0127253 A1 5/2009 Stark et al.
2009/0151717 A1 6/2009 Bowen et al.
2009/0162294 A1 6/2009 Werner
2009/0180968 A1 7/2009 Hale et al.
2009/0188490 A1 7/2009 Han
2009/0199843 A1 8/2009 Farone et al.
2009/0217923 A1 9/2009 Boehm et al.
2009/0230117 A1 9/2009 Fernando et al.
2009/0241947 A1 10/2009 Bedini et al.
2009/0255923 A1 10/2009 Buehrer et al.
2009/0260641 A1 10/2009 Monsees et al.
2009/0260642 A1 10/2009 Monsees et al.
2009/0272379 A1 11/2009 Thorens et al.
2009/0280043 A1 11/2009 Ferguson
2009/0293892 A1 12/2009 Williams et al.
2009/0301363 A1 12/2009 Damani et al.
2009/0301471 A1 12/2009 Stirzel
2009/0302019 A1 12/2009 Selenski et al.
2009/0304372 A1 12/2009 Gubler et al.
2010/0006092 A1 1/2010 Hale et al.
2010/0025023 A1 2/2010 Schmidt et al.
2010/0031968 A1 2/2010 Sheikh et al.
2010/0043809 A1 2/2010 Magnon
2010/0059070 A1 3/2010 Potter et al.
2010/0065052 A1 3/2010 Sharma et al.
2010/0065653 A1 3/2010 Wingo et al.
2010/0068154 A1 3/2010 Sharma et al.
2010/0083959 A1 4/2010 Siller
2010/0089381 A1 4/2010 Bolmer et al.
2010/0108059 A1 5/2010 Axelsson et al.
2010/0126516 A1 5/2010 Yomtov et al.
2010/0147299 A1 6/2010 Row et al.
2010/0181387 A1 7/2010 Zaffaroni et al.
2010/0200006 A1 8/2010 Robinson et al.
2010/0236546 A1 9/2010 Yamada et al.
2010/0242974 A1 9/2010 Pan
2010/0242975 A1 9/2010 Hearn
2010/0258585 A1 10/2010 Jamison
2010/0268212 A1 10/2010 Manwaring et al.
2010/0300467 A1 12/2010 Kuistila et al.
2010/0307518 A1 12/2010 Wang
2010/0313901 A1 12/2010 Stahle et al.
2011/0005535 A1 1/2011 Xiu
2011/0011396 A1 1/2011 Fang
2011/0030671 A1 2/2011 Ferguson et al.
2011/0036363 A1 2/2011 Urtsev et al.
2011/0090266 A1 4/2011 King et al.
2011/0094523 A1 4/2011 Thorens et al.
2011/0120989 A1 5/2011 Schilling et al.
2011/0126848 A1 6/2011 Zuber et al.
2011/0155153 A1 6/2011 Thorens et al.
2011/0155718 A1 6/2011 Greim et al.
2011/0192408 A1 8/2011 Inagaki et al.
2011/0192914 A1 8/2011 Ishigami
2011/0226236 A1 9/2011 Buchberger
2011/0240022 A1 10/2011 Hodges et al.
2011/0264084 A1 10/2011 Reid
2011/0277757 A1 11/2011 Terry et al.
2011/0283458 A1 11/2011 Gillette et al.
2011/0290266 A1 12/2011 Koeller
2011/0290267 A1 12/2011 Yamada et al.
2011/0297166 A1 12/2011 Takeuchi et al.
2011/0303230 A1 12/2011 Thiry
2011/0303231 A1 12/2011 Li et al.
2012/0006342 A1 1/2012 Rose et al.
2012/0006343 A1 1/2012 Renaud et al.
2012/0132196 A1 5/2012 Madyslavovych
2012/0145169 A1 6/2012 Wu
2012/0145189 A1 6/2012 Knopow et al.
2012/0234315 A1* 9/2012 Li ........................ A61M 15/06
128/200.21
2012/0234821 A1 9/2012 Shimizu
2012/0255546 A1 10/2012 Goetz et al.
2012/0260927 A1 10/2012 Liu
2012/0285476 A1 11/2012 Hon
2013/0042865 A1 2/2013 Monsees et al.
2013/0061861 A1 3/2013 Hearn
2013/0074857 A1 3/2013 Buchberger
2013/0081623 A1 4/2013 Buchberger
2013/0087160 A1 4/2013 Gherghe
2013/0133675 A1 5/2013 Shinozaki et al.
2013/0142782 A1 6/2013 Rahmel et al.
2013/0152922 A1 6/2013 Benassayag et al.
2013/0192615 A1 8/2013 Tucker et al.
2013/0213419 A1 8/2013 Tucker et al.
2013/0284192 A1 10/2013 Peleg et al.
2013/0306084 A1 11/2013 Flick
2013/0313246 A1 11/2013 Long et al.
2013/0333700 A1 12/2013 Buchberger
2013/0340779 A1 12/2013 Liu
2014/0000638 A1 1/2014 Sebastian et al.
2014/0060528 A1 3/2014 Liu
2014/0060554 A1 3/2014 Collett et al.
2014/0060555 A1 3/2014 Chang et al.
2014/0091083 A1 4/2014 Mcgarvey
2014/0096781 A1 4/2014 Sears et al.
2014/0182608 A1 7/2014 Egoyants et al.
2014/0182843 A1 7/2014 Vinegar
2014/0196716 A1 7/2014 Liu
2014/0202454 A1 7/2014 Buchberger

(56) References Cited

U.S. PATENT DOCUMENTS

2014/0202476 A1 7/2014 Egoyants et al.
2014/0209105 A1 7/2014 Sears et al.
2014/0216482 A1 8/2014 Dotan et al.
2014/0216485 A1 8/2014 Egoyants et al.
2014/0238396 A1 8/2014 Buchberger
2014/0238423 A1 8/2014 Tucker et al.
2014/0238424 A1 8/2014 Macko et al.
2014/0238737 A1 8/2014 Backman
2014/0261490 A1 9/2014 Kane
2014/0270726 A1 9/2014 Egoyants et al.
2014/0270730 A1 9/2014 Depiano et al.
2014/0283825 A1 9/2014 Buchberger
2014/0286630 A1 9/2014 Buchberger
2014/0299125 A1 10/2014 Buchberger
2014/0305449 A1 10/2014 Plojoux et al.
2014/0326257 A1 11/2014 Jalloul et al.
2014/0334802 A1 11/2014 Dubief
2014/0338680 A1 11/2014 Abramov et al.
2014/0360515 A1 12/2014 Vasiliev et al.
2015/0020825 A1 1/2015 Galloway et al.
2015/0040925 A1 2/2015 Saleem et al.
2015/0059780 A1* 3/2015 Davis ...................... A24F 40/46 392/386
2015/0114406 A1 4/2015 Newton
2015/0114411 A1 4/2015 Buchberger
2015/0142088 A1 5/2015 Riva Godoy
2015/0157055 A1 6/2015 Lord
2015/0157756 A1 6/2015 Duffield et al.
2015/0196058 A1 7/2015 Lord
2015/0208728 A1 7/2015 Lord
2015/0223292 A1 8/2015 Duffield et al.
2015/0223520 A1 8/2015 Phillips et al.
2015/0245669 A1 9/2015 Cadieux et al.
2015/0272219 A1 10/2015 Hatrick et al.
2015/0282256 A1 10/2015 Iguro et al.
2015/0302971 A1 10/2015 Wagman et al.
2015/0320116 A1 11/2015 Bleloch et al.
2016/0003403 A1 1/2016 Smith
2016/0036222 A1 2/2016 Templeton et al.
2016/0044963 A1 2/2016 Saleem
2016/0073693 A1 3/2016 Reevell
2016/0088685 A1 3/2016 Henke et al.
2016/0106154 A1 4/2016 Lord
2016/0106155 A1 4/2016 Reevell
2016/0146506 A1 5/2016 Brereton et al.
2016/0150825 A1 6/2016 Mironov et al.
2016/0150828 A1 6/2016 Goldstein et al.
2016/0168438 A1 6/2016 Harding et al.
2016/0248280 A1 8/2016 Ben-shalom et al.
2016/0255879 A1 9/2016 Paprocki et al.
2016/0295921 A1 10/2016 Mironov et al.
2017/0006916 A1 1/2017 Liu
2017/0042245 A1 2/2017 Buchberger et al.
2017/0055574 A1 3/2017 Kaufman et al.
2017/0055575 A1 3/2017 Wilke et al.
2017/0055580 A1 3/2017 Blandino et al.
2017/0055581 A1 3/2017 Wilke et al.
2017/0055582 A1 3/2017 Blandino et al.
2017/0055583 A1 3/2017 Blandino et al.
2017/0055584 A1 3/2017 Blandino et al.
2017/0071250 A1 3/2017 Mironov et al.
2017/0079325 A1 3/2017 Mironov
2017/0086508 A1 3/2017 Mironov et al.
2017/0095006 A1 4/2017 Egoyants et al.
2017/0119046 A1 5/2017 Kaufman et al.
2017/0119047 A1 5/2017 Blandino et al.
2017/0119048 A1 5/2017 Kaufman et al.
2017/0119049 A1 5/2017 Blandino et al.
2017/0119050 A1 5/2017 Blandino et al.
2017/0119051 A1 5/2017 Blandino et al.
2017/0119054 A1 5/2017 Zinovik et al.
2017/0156403 A1 6/2017 Gill et al.
2017/0156406 A1 6/2017 Abramov et al.
2017/0156407 A1 6/2017 Abramov et al.
2017/0197043 A1 7/2017 Buchberger
2017/0197044 A1 7/2017 Buchberger
2017/0197046 A1 7/2017 Buchberger
2017/0197048 A1 7/2017 Khosrowshahi et al.
2017/0197049 A1 7/2017 Doll
2017/0197050 A1 7/2017 Reinburg et al.
2017/0231281 A1 8/2017 Hatton et al.
2017/0303585 A1 10/2017 Florack et al.
2017/0332700 A1 11/2017 Plews et al.
2017/0340008 A1 11/2017 Sebastian et al.
2018/0184713 A1 7/2018 Mironov et al.
2018/0192700 A1 7/2018 Fraser et al.
2018/0214645 A1 8/2018 Reevell
2018/0235279 A1 8/2018 Wilke et al.
2018/0242633 A1 8/2018 Wilke et al.
2018/0242636 A1 8/2018 Blandino et al.
2018/0249760 A1 9/2018 Kaufman et al.
2018/0271171 A1 9/2018 Abramov et al.
2018/0279677 A1 10/2018 Blandino et al.
2018/0317552 A1 11/2018 Kaufman et al.
2018/0317553 A1 11/2018 Blandino et al.
2018/0317554 A1 11/2018 Kaufman et al.
2018/0317555 A1 11/2018 Blandino et al.
2018/0325173 A1 11/2018 Blandino et al.
2019/0000142 A1 1/2019 Lavanchy et al.
2019/0014820 A1 1/2019 Malgat
2019/0082738 A1 3/2019 Blandino et al.
2019/0191780 A1 6/2019 Wilke et al.
2019/0230988 A1 8/2019 Aoun
2019/0239555 A1 8/2019 Nicholson
2019/0313695 A1 10/2019 Kaufman et al.
2019/0364973 A1 12/2019 Kaufman et al.
2020/0054068 A1 2/2020 Blandino et al.
2020/0054069 A1 2/2020 Blandino et al.
2020/0229497 A1 7/2020 Aoun et al.
2020/0268053 A1 8/2020 Thorsen et al.
2020/0288774 A1 9/2020 Blandino et al.
2020/0352237 A1 11/2020 Kaufman et al.
2021/0093008 A1 4/2021 White et al.
2021/0093012 A1 4/2021 White et al.
2021/0137167 A1 5/2021 Aoun et al.
2021/0186109 A1 6/2021 Milligan et al.

FOREIGN PATENT DOCUMENTS

AT 321190 B 3/1975
AT 321191 B 3/1975
AT 507187 B1 3/2010
AT 508244 A4 12/2010
AT 510405 A4 4/2012
AT 510504 A1 4/2012
AU 6393173 A 6/1975
AU 2002364521 A1 6/2003
AU 2018241908 B2 9/2020
AU 2020281092 A1 1/2021
CA 2160990 A1 10/1994
CA 2146954 A1 10/1996
CA 2309376 A1 11/2000
CA 2414161 A1 1/2002
CA 2414191 A1 1/2002
CA 2520759 A1 10/2004
CA 2492255 A1 7/2006
CA 2668465 A1 12/2009
CA 2712412 A1 12/2009
CA 2641869 A1 5/2010
CA 2862048 A1 7/2013
CA 2900284 A1 8/2014
CA 2923377 A1 6/2015
CA 2989375 A1 1/2017
CH 513656 A 10/1971
CH 698603 B1 9/2009
CL 199400288 A1 8/1995
CL 2007002226 A1 2/2008
CL 2013003637 A1 7/2014
CL 2014002840 A1 12/2014
CL 2017003408 A1 6/2018
CN 86102917 A 11/1987
CN 1038085 A 12/1989
CN 1040914 A 4/1990
CN 1043076 A 6/1990

(56) References Cited

FOREIGN PATENT DOCUMENTS

| | | | | |
|---|---|---|---|---|
| CN | 1045691 | A | 10/1990 | |
| CN | 2092880 | U | 1/1992 | |
| CN | 1059649 | A | 3/1992 | |
| CN | 2144261 | Y | 10/1993 | |
| CN | 1106812 | A | 8/1995 | |
| CN | 2220168 | Y | 2/1996 | |
| CN | 1121385 | A | 4/1996 | |
| CN | 1122213 | A | 5/1996 | |
| CN | 1123000 | A | 5/1996 | |
| CN | 1123001 | A | 5/1996 | |
| CN | 1126426 | A | 7/1996 | |
| CN | 2246744 | Y | 2/1997 | |
| CN | 1158757 | A | 9/1997 | |
| CN | 1161635 | A | 10/1997 | |
| CN | 1195270 | A | 10/1998 | |
| CN | 1196660 | A | 10/1998 | |
| CN | 1196661 | A | 10/1998 | |
| CN | 1205849 | A | 1/1999 | |
| CN | 1209731 | A | 3/1999 | |
| CN | 1287890 | A | 3/2001 | |
| CN | 1293591 | A | 5/2001 | |
| CN | 1293596 | A | 5/2001 | |
| CN | 1312730 | A | 9/2001 | |
| CN | 1106812 | C | 4/2003 | |
| CN | 1130109 | C | 12/2003 | |
| CN | 1130137 | C | 12/2003 | |
| CN | 2598364 | Y | 1/2004 | |
| CN | 1495417 | A | 5/2004 | |
| CN | 1151739 | C | 6/2004 | |
| CN | 1545823 | A | 11/2004 | |
| CN | 1575135 | A | 2/2005 | |
| CN | 1578895 | A | 2/2005 | |
| CN | 1641976 | A | 7/2005 | |
| CN | 2719043 | Y | 8/2005 | |
| CN | 1679419 | A | 10/2005 | |
| CN | 1694765 | A | 11/2005 | |
| CN | 1703279 | A | 11/2005 | |
| CN | 200966824 | Y | 10/2007 | |
| CN | 101084034 | A | 12/2007 | |
| CN | 201076006 | Y | 6/2008 | |
| CN | 101238047 | A | 8/2008 | |
| CN | 101267749 | A | 9/2008 | |
| CN | 101277622 | A | 10/2008 | |
| CN | 101282660 | A | 10/2008 | |
| CN | 201185656 | Y | 1/2009 | |
| CN | 101390659 | A | 3/2009 | |
| CN | 201199922 | Y | 3/2009 | |
| CN | 201238609 | Y | 5/2009 | |
| CN | 101500443 | A | 8/2009 | |
| CN | 101516425 | A | 8/2009 | |
| CN | 101557728 | A | 10/2009 | |
| CN | 201375023 | Y | 1/2010 | |
| CN | 101648041 | A | 2/2010 | |
| CN | 201445686 | U | 5/2010 | |
| CN | 101878958 | A | 11/2010 | |
| CN | 101912654 | A | 12/2010 | |
| CN | 101925309 | A | 12/2010 | |
| CN | 102014677 | A | 4/2011 | |
| CN | 201869778 | U | 6/2011 | |
| CN | 102131411 | A | 7/2011 | |
| CN | 102186271 | A | 9/2011 | |
| CN | 102212340 | A | 10/2011 | |
| CN | 202172846 | U | 3/2012 | |
| CN | 102483237 | A | 5/2012 | |
| CN | 102499466 | A | 6/2012 | |
| CN | 102539005 | A | 7/2012 | |
| CN | 102575954 | A | 7/2012 | |
| CN | 102604599 | A | 7/2012 | |
| CN | 202351223 | U | 7/2012 | |
| CN | 102655773 | A | 9/2012 | |
| CN | 202722498 | U | 2/2013 | |
| CN | 202750708 | U | 2/2013 | |
| CN | 103052380 | A | 4/2013 | |
| CN | 103054196 | A | 4/2013 | |
| CN | 103202540 | A | 7/2013 | |
| CN | 103359550 | A | 10/2013 | |
| CN | 203369386 | U | 1/2014 | |
| CN | 103608619 | A | 2/2014 | |
| CN | 103689812 | A | 4/2014 | |
| CN | 103689815 | A | 4/2014 | |
| CN | 103763954 | A | 4/2014 | |
| CN | 103974640 | A | 8/2014 | |
| CN | 103997922 | A | 8/2014 | |
| CN | 104010531 | A | 8/2014 | |
| CN | 203748673 | U | 8/2014 | |
| CN | 203761188 | U | 8/2014 | |
| CN | 203762288 | U | 8/2014 | |
| CN | 104039183 | A | 9/2014 | |
| CN | 104095291 | A | 10/2014 | |
| CN | 104095293 | A | 10/2014 | |
| CN | 104095295 | A | 10/2014 | |
| CN | 104132742 | A | 11/2014 | |
| CN | 203952405 | * | 11/2014 | ........... A24F 40/465 |
| CN | 104203016 | A | 12/2014 | |
| CN | 104223359 | A | 12/2014 | |
| CN | 203986095 | U | 12/2014 | |
| CN | 104256899 | A | 1/2015 | |
| CN | 204091003 | U | 1/2015 | |
| CN | 204120226 | U | 1/2015 | |
| CN | 104540406 | A | 4/2015 | |
| CN | 104544559 | A | 4/2015 | |
| CN | 104619202 | A | 5/2015 | |
| CN | 104664608 | A | 6/2015 | |
| CN | 104677116 | A | 6/2015 | |
| CN | 104703308 | A | 6/2015 | |
| CN | 104720121 | A | 6/2015 | |
| CN | 204440191 | U | 7/2015 | |
| CN | 204519365 | U | 8/2015 | |
| CN | 204539505 | U | 8/2015 | |
| CN | 204599333 | U | 9/2015 | |
| CN | 204949521 | U | 1/2016 | |
| CN | 105307524 | A | 2/2016 | |
| CN | 105307525 | A | 2/2016 | |
| CN | 106102863 | A | 11/2016 | |
| CN | 106455712 | A | 2/2017 | |
| CN | 106617325 | A | 5/2017 | |
| CN | 109330030 | A | 2/2019 | |
| DE | 360431 | C | 10/1922 | |
| DE | 1100884 | B | 3/1961 | |
| DE | 1425872 | A1 | 11/1968 | |
| DE | 1290499 | B | 3/1969 | |
| DE | 1813993 | A1 | 6/1970 | |
| DE | 1425871 | B1 | 10/1970 | |
| DE | 1950439 | A1 | 4/1971 | |
| DE | 2315789 | A1 | 10/1973 | |
| DE | 3148335 | A1 | 7/1983 | |
| DE | 3218760 | A1 | 12/1983 | |
| DE | 3936687 | A1 | 5/1990 | |
| DE | 4105370 | A1 | 8/1992 | |
| DE | 4307144 | C2 | 1/1995 | |
| DE | 4343578 | A1 | 6/1995 | |
| DE | 29509286 | U1 | 8/1995 | |
| DE | 4420366 | A1 | 12/1995 | |
| DE | 29700307 | U1 | 4/1997 | |
| DE | 29713866 | U1 | 10/1997 | |
| DE | 29719509 | U1 | 1/1998 | |
| DE | 19630619 | A1 | 2/1998 | |
| DE | 19654945 | A1 | 3/1998 | |
| DE | 19854007 | A1 | 5/2000 | |
| DE | 19854009 | A1 | 5/2000 | |
| DE | 10058642 | A1 | 6/2001 | |
| DE | 10007521 | A1 | 8/2001 | |
| DE | 10064288 | A1 | 8/2001 | |
| DE | 10164587 | A1 | 7/2003 | |
| DE | 10330681 | B3 | 6/2004 | |
| DE | 102005024803 | A1 | 6/2006 | |
| DE | 202006013439 | U1 | 10/2006 | |
| DE | 102005023278 | A1 | 11/2006 | |
| DE | 102005056885 | A1 | 5/2007 | |
| DE | 102006041544 | A1 | 8/2007 | |
| DE | 102006041042 | A1 | 3/2008 | |
| DE | 102006047146 | A1 | 4/2008 | |
| DE | 102007011120 | A1 | 9/2008 | |
| DE | 102008034509 | A1 | 4/2009 | |

(56) References Cited

FOREIGN PATENT DOCUMENTS

| | | | |
|---|---|---|---|
| DE | 102008013303 | A1 | 9/2009 |
| DE | 202009010400 | U1 | 11/2009 |
| DE | 102008038121 | A1 | 2/2010 |
| DE | 202010011436 | U1 | 11/2010 |
| DE | 102009047185 | A1 | 6/2011 |
| DE | 102010046482 | A1 | 3/2012 |
| DE | 202013100606 | U1 | 2/2013 |
| DE | 102013002555 | A1 | 6/2014 |
| DK | 114399 | B | 6/1969 |
| DK | 488488 | A | 3/1989 |
| DK | 0540774 | T3 | 7/1995 |
| DK | 0540775 | T3 | 8/1997 |
| EA | 018280 | B1 | 6/2013 |
| EP | 0033668 | A1 | 8/1981 |
| EP | 0076897 | A1 | 4/1983 |
| EP | 0033668 | B1 | 6/1983 |
| EP | 0149997 | A2 | 7/1985 |
| EP | 0194257 | A1 | 9/1986 |
| EP | 0280262 | A2 | 8/1988 |
| EP | 0295122 | A2 | 12/1988 |
| EP | 0309227 | A2 | 3/1989 |
| EP | 0358002 | A2 | 3/1990 |
| EP | 0358114 | A2 | 3/1990 |
| EP | 0371285 | A2 | 6/1990 |
| EP | 0418464 | A2 | 3/1991 |
| EP | 0430559 | A2 | 6/1991 |
| EP | 0430566 | A2 | 6/1991 |
| EP | 0438862 | A2 | 7/1991 |
| EP | 0444553 | A2 | 9/1991 |
| EP | 0488488 | A1 | 6/1992 |
| EP | 0491952 | A1 | 7/1992 |
| EP | 0503767 | A1 | 9/1992 |
| EP | 0503794 | A1 | 9/1992 |
| EP | 0520231 | A2 | 12/1992 |
| EP | 0603613 | A1 | 6/1994 |
| EP | 0430559 | B1 | 3/1995 |
| EP | 0703735 | A1 | 4/1996 |
| EP | 0354661 | B1 | 4/1997 |
| EP | 0540775 | B1 | 7/1997 |
| EP | 0823492 | A2 | 2/1998 |
| EP | 0824927 | A2 | 2/1998 |
| EP | 0845220 | A1 | 6/1998 |
| EP | 0857431 | A1 | 8/1998 |
| EP | 0653218 | B1 | 9/1998 |
| EP | 0884928 | A1 | 12/1998 |
| EP | 0893071 | A1 | 1/1999 |
| EP | 1064083 | A2 | 1/2001 |
| EP | 1064101 | A2 | 1/2001 |
| EP | 1076014 | A2 | 2/2001 |
| EP | 1111191 | A2 | 6/2001 |
| EP | 0703735 | B1 | 7/2001 |
| EP | 1128741 | A1 | 9/2001 |
| EP | 1128742 | A1 | 9/2001 |
| EP | 1128743 | A1 | 9/2001 |
| EP | 1148905 | A2 | 10/2001 |
| EP | 1166814 | A2 | 1/2002 |
| EP | 1166847 | A2 | 1/2002 |
| EP | 1203189 | A1 | 5/2002 |
| EP | 1217320 | A2 | 6/2002 |
| EP | 1298993 | A1 | 4/2003 |
| EP | 1299499 | A1 | 4/2003 |
| EP | 1299500 | A2 | 4/2003 |
| EP | 1301152 | A2 | 4/2003 |
| EP | 0845220 | B1 | 9/2003 |
| EP | 1349601 | A2 | 10/2003 |
| EP | 1357025 | A2 | 10/2003 |
| EP | 1390112 | A1 | 2/2004 |
| EP | 1409051 | A2 | 4/2004 |
| EP | 1439876 | A2 | 7/2004 |
| EP | 1454840 | A1 | 9/2004 |
| EP | 1490452 | A2 | 12/2004 |
| EP | 1506792 | A2 | 2/2005 |
| EP | 1609376 | A1 | 12/2005 |
| EP | 1618803 | A1 | 1/2006 |
| EP | 1625334 | A2 | 2/2006 |
| EP | 1625335 | A2 | 2/2006 |
| EP | 1625336 | A2 | 2/2006 |
| EP | 1454840 | B1 | 9/2006 |
| EP | 1536703 | B1 | 9/2006 |
| EP | 1702639 | A2 | 9/2006 |
| EP | 1736065 | A1 | 12/2006 |
| EP | 1749548 | A2 | 2/2007 |
| EP | 1757921 | A2 | 2/2007 |
| EP | 1867357 | A1 | 12/2007 |
| EP | 1891867 | A2 | 2/2008 |
| EP | 1940254 | A2 | 7/2008 |
| EP | 1996880 | A2 | 12/2008 |
| EP | 2011033 | A2 | 1/2009 |
| EP | 2018886 | A1 | 1/2009 |
| EP | 2022349 | A1 | 2/2009 |
| EP | 2044967 | A1 | 4/2009 |
| EP | 1357025 | B1 | 7/2009 |
| EP | 2083642 | A1 | 8/2009 |
| EP | 2110033 | A1 | 10/2009 |
| EP | 2110034 | A1 | 10/2009 |
| EP | 2113178 | A1 | 11/2009 |
| EP | 2138058 | A1 | 12/2009 |
| EP | 2138059 | A1 | 12/2009 |
| EP | 1947965 | B1 | 2/2010 |
| EP | 2179229 | A2 | 4/2010 |
| EP | 2191735 | A1 | 6/2010 |
| EP | 2227973 | A1 | 9/2010 |
| EP | 2234508 | A2 | 10/2010 |
| EP | 2241203 | A2 | 10/2010 |
| EP | 2138057 | B1 | 11/2010 |
| EP | 2246086 | A2 | 11/2010 |
| EP | 2249669 | A1 | 11/2010 |
| EP | 2253541 | A1 | 11/2010 |
| EP | 2257195 | A1 | 12/2010 |
| EP | 2277398 | A1 | 1/2011 |
| EP | 2303043 | A2 | 4/2011 |
| EP | 2316286 | A1 | 5/2011 |
| EP | 2327318 | A1 | 6/2011 |
| EP | 2330866 | A2 | 6/2011 |
| EP | 2340729 | A1 | 7/2011 |
| EP | 2340730 | A1 | 7/2011 |
| EP | 2368449 | A1 | 9/2011 |
| EP | 2003997 | B1 | 10/2011 |
| EP | 2394520 | A1 | 12/2011 |
| EP | 2408494 | A1 | 1/2012 |
| EP | 2444112 | A1 | 4/2012 |
| EP | 2253541 | B1 | 5/2012 |
| EP | 2472185 | A1 | 7/2012 |
| EP | 2512205 | A1 | 10/2012 |
| EP | 2520186 | A1 | 11/2012 |
| EP | 2523752 | A1 | 11/2012 |
| EP | 2542131 | A2 | 1/2013 |
| EP | 2645814 | A1 | 10/2013 |
| EP | 2696652 | A1 | 2/2014 |
| EP | 2698070 | A1 | 2/2014 |
| EP | 2760303 | A2 | 8/2014 |
| EP | 2762019 | A1 | 8/2014 |
| EP | 2785208 | A1 | 10/2014 |
| EP | 2835062 | A1 | 2/2015 |
| EP | 2907397 | A1 | 8/2015 |
| EP | 2967156 | A1 | 1/2016 |
| EP | 2975958 | A1 | 1/2016 |
| EP | 2996504 | A1 | 3/2016 |
| EP | 2967156 | B1 | 11/2016 |
| EP | 2996504 | B1 | 11/2016 |
| EP | 3337342 | A1 | 6/2018 |
| EP | 3367828 | A1 | 9/2018 |
| ES | 262308 | U | 6/1982 |
| FR | 718708 | A | 1/1932 |
| FR | 960469 | A | 4/1950 |
| FR | 1418189 | A | 11/1965 |
| FR | 2573985 | A1 | 6/1986 |
| FR | 2604093 | A1 | 3/1988 |
| FR | 2700697 | A1 | 7/1994 |
| FR | 2730166 | A1 | 8/1996 |
| FR | 2818152 | A1 | 6/2002 |
| FR | 2842791 | B1 | 4/2005 |
| FR | 2873584 | B1 | 11/2006 |
| GB | 25575 | | 3/1912 |

(56) References Cited

FOREIGN PATENT DOCUMENTS

| | | | |
|---|---|---|---|
| GB | 191126138 | A | 3/1912 |
| GB | 347650 | A | 4/1931 |
| GB | 353745 | A | 7/1931 |
| GB | 426247 | A | 3/1935 |
| GB | 910166 | A | 11/1962 |
| GB | 922310 | A | 3/1963 |
| GB | 958867 | A | 5/1964 |
| GB | 1104214 | A | 2/1968 |
| GB | 1227333 | A | 4/1971 |
| GB | 1313525 | A | 4/1973 |
| GB | 1379688 | A | 1/1975 |
| GB | 1431334 | A | 4/1976 |
| GB | 2294401 | A | 5/1996 |
| GB | 2323033 | A | 9/1998 |
| GB | 2342874 | A | 4/2000 |
| GB | 2388040 | A | 11/2003 |
| GB | 2412326 | A | 9/2005 |
| GB | 2412876 | A | 10/2005 |
| GB | 2448478 | A | 10/2008 |
| GB | 2487851 | A | 8/2012 |
| GB | 2495923 | A | 5/2013 |
| GB | 2504732 | A | 2/2014 |
| HK | 1196511 | A1 | 12/2014 |
| HK | 1226611 | A | 10/2017 |
| IE | 63083 | B1 | 3/1995 |
| IT | 1289590 | B1 | 10/1998 |
| IT | RM20120193 | A1 | 8/2012 |
| JP | S4961986 | A | 6/1974 |
| JP | S5096908 | A | 8/1975 |
| JP | S5314173 | A | 2/1978 |
| JP | S5594260 | A | 7/1980 |
| JP | S5752456 | A | 3/1982 |
| JP | S57110260 | A | 7/1982 |
| JP | S57177769 | A | 11/1982 |
| JP | S5927491 | A | 2/1984 |
| JP | S59106340 | A | 6/1984 |
| JP | S60171520 | A | 9/1985 |
| JP | S6196763 | A | 5/1986 |
| JP | S6196765 | A | 5/1986 |
| JP | S62501050 | A | 4/1987 |
| JP | S62205184 | A | 9/1987 |
| JP | S6360322 | A | 3/1988 |
| JP | S63153666 | A | 6/1988 |
| JP | H01191674 | A | 8/1989 |
| JP | H01166953 | U | 11/1989 |
| JP | H0292986 | A | 4/1990 |
| JP | H0292988 | A | 4/1990 |
| JP | H02124081 | A | 5/1990 |
| JP | H02127493 | A | 5/1990 |
| JP | H02190171 | A | 7/1990 |
| JP | H034479 | A | 1/1991 |
| JP | H0341185 | A | 2/1991 |
| JP | H03112478 | A | 5/1991 |
| JP | H03192677 | A | 8/1991 |
| JP | H03232481 | A | 10/1991 |
| JP | H05103836 | A | 4/1993 |
| JP | H05115272 | A | 5/1993 |
| JP | H05193668 | A | 8/1993 |
| JP | H05212100 | A | 8/1993 |
| JP | H05309136 | A | 11/1993 |
| JP | H062164 | B1 | 1/1994 |
| JP | H06189861 | A | 7/1994 |
| JP | H06295782 | A | 10/1994 |
| JP | H06315366 | A | 11/1994 |
| JP | H07147965 | A | 6/1995 |
| JP | H0851175 | A | 2/1996 |
| JP | H08942 | U | 6/1996 |
| JP | 2519658 | B2 | 7/1996 |
| JP | H08228751 | A | 9/1996 |
| JP | H08299862 | A | 11/1996 |
| JP | H08511175 | A | 11/1996 |
| JP | H08511176 | A | 11/1996 |
| JP | H09107943 | A | 4/1997 |
| JP | H09257256 | A | 9/1997 |
| JP | 3044574 | U | 12/1997 |
| JP | 3053426 | U | 10/1998 |
| JP | H1189551 | A | 4/1999 |
| JP | H11503912 | A | 4/1999 |
| JP | H11125390 | A | 5/1999 |
| JP | H11169157 | A | 6/1999 |
| JP | H11507234 | A | 6/1999 |
| JP | H11178562 | A | 7/1999 |
| JP | H11514081 | A | 11/1999 |
| JP | 2000051556 | A | 2/2000 |
| JP | 3016586 | B2 | 3/2000 |
| JP | 2000082576 | A | 3/2000 |
| JP | 2000093155 | A | 4/2000 |
| JP | 2000119643 | A | 4/2000 |
| JP | 3078033 | B2 | 8/2000 |
| JP | 2000515576 | A | 11/2000 |
| JP | 3118462 | B2 | 12/2000 |
| JP | 3118463 | B2 | 12/2000 |
| JP | 2001063776 | A | 3/2001 |
| JP | 2001112458 | A | 4/2001 |
| JP | 2002170657 | A | 6/2002 |
| JP | 2002527153 | A | 8/2002 |
| JP | 2002253593 | A | 9/2002 |
| JP | 2002529111 | A | 9/2002 |
| JP | 2002336290 | A | 11/2002 |
| JP | 2003034785 | A | 2/2003 |
| JP | 3392138 | B2 | 3/2003 |
| JP | 2003142243 | A | 5/2003 |
| JP | 3413208 | B2 | 6/2003 |
| JP | 2004055547 | A | 2/2004 |
| JP | 2004504580 | A | 2/2004 |
| JP | 3588469 | B2 | 11/2004 |
| JP | 2004332069 | A | 11/2004 |
| JP | 2005036897 | A | 2/2005 |
| JP | 2005050624 | A | 2/2005 |
| JP | 2005106350 | A | 4/2005 |
| JP | 2005516647 | A | 6/2005 |
| JP | 2005524067 | A | 8/2005 |
| JP | 2005300005 | A | 10/2005 |
| JP | 2005537918 | A | 12/2005 |
| JP | 2005537919 | A | 12/2005 |
| JP | 2005538149 | A | 12/2005 |
| JP | 2005538159 | A | 12/2005 |
| JP | 2006501871 | A | 1/2006 |
| JP | 2006504431 | A | 2/2006 |
| JP | 2006219557 | A | 8/2006 |
| JP | 2006524494 | A | 11/2006 |
| JP | 2007057532 | A | 3/2007 |
| JP | 2007512880 | A | 5/2007 |
| JP | 2007516015 | A | 6/2007 |
| JP | 2007522900 | A | 8/2007 |
| JP | 2008035742 | A | 2/2008 |
| JP | 2008509907 | A | 4/2008 |
| JP | 2008511175 | A | 4/2008 |
| JP | 2008518614 | A | 6/2008 |
| JP | 2008249003 | A | 10/2008 |
| JP | 2008311058 | A | 12/2008 |
| JP | 2009501537 | A | 1/2009 |
| JP | 2009509523 | A | 3/2009 |
| JP | 2009087703 | A | 4/2009 |
| JP | 2009537119 | A | 10/2009 |
| JP | 2009537120 | A | 10/2009 |
| JP | 2010041354 | A | 2/2010 |
| JP | 2010506594 | A | 3/2010 |
| JP | 2010172104 | A | 8/2010 |
| JP | 2010178730 | A | 8/2010 |
| JP | 2010526553 | A | 8/2010 |
| JP | 2010213579 | A | 9/2010 |
| JP | 2010535530 | A | 11/2010 |
| JP | 2011058538 | A | 3/2011 |
| JP | 2011509667 | A | 3/2011 |
| JP | 2011515080 | A | 5/2011 |
| JP | 2011515093 | A | 5/2011 |
| JP | 2011113977 | A | 6/2011 |
| JP | 2011518567 | A | 6/2011 |
| JP | 2011135901 | A | 7/2011 |
| JP | 2011525366 | A | 9/2011 |
| JP | 2012506263 | A | 3/2012 |
| JP | 2012529936 | A | 11/2012 |
| JP | 2012249854 | A | 12/2012 |

(56) References Cited

FOREIGN PATENT DOCUMENTS

| | | | |
|---|---|---|---|
| JP | 2013054873 | A | 3/2013 |
| JP | 2013073939 | A | 4/2013 |
| JP | 5193668 | B2 | 5/2013 |
| JP | 5217980 | B2 | 6/2013 |
| JP | 2013150593 | A | 8/2013 |
| JP | 2013226810 | A | 11/2013 |
| JP | 2014519586 | A | 8/2014 |
| JP | 2014525251 | A | 9/2014 |
| JP | 2014526275 | A | 10/2014 |
| JP | 2014527606 | A | 10/2014 |
| JP | 2014229498 | A | 12/2014 |
| JP | 2014533513 | A | 12/2014 |
| JP | 2015503336 | A | 2/2015 |
| JP | 2015503337 | A | 2/2015 |
| JP | 2015504667 | A | 2/2015 |
| JP | 2015060837 | A | 3/2015 |
| JP | 2015506170 | A | 3/2015 |
| JP | 2015508287 | A | 3/2015 |
| JP | 2015509706 | A | 4/2015 |
| JP | 2015098645 | A | 5/2015 |
| JP | 2015513922 | A | 5/2015 |
| JP | 2015513970 | A | 5/2015 |
| JP | 2015524261 | A | 8/2015 |
| JP | 2015531601 | A | 11/2015 |
| JP | 2016036222 | A | 3/2016 |
| JP | 2016524777 | A | 8/2016 |
| JP | 2016525341 | A | 8/2016 |
| JP | 2016189525 | A | 11/2016 |
| JP | 2017515490 | A | 6/2017 |
| JP | 2017520234 | A | 7/2017 |
| JP | 2017526381 | A | 9/2017 |
| JP | 6217980 | B2 | 10/2017 |
| JP | 2017533732 | A | 11/2017 |
| JP | 2018520664 | A | 8/2018 |
| JP | 2018529324 | A | 10/2018 |
| JP | 2019065344 | A | 4/2019 |
| JP | 2020182327 | A | 11/2020 |
| JP | 2021508438 | A | 3/2021 |
| JP | 2021078359 | A | 5/2021 |
| KR | 19910008188 | B1 | 10/1991 |
| KR | 950700692 | A | 2/1995 |
| KR | 960702734 | A | 5/1996 |
| KR | 0178388 | B1 | 2/1999 |
| KR | 19990081973 | A | 11/1999 |
| KR | 100286488 | B1 | 4/2001 |
| KR | 100341602 | B1 | 11/2002 |
| KR | 100385395 | B1 | 8/2003 |
| KR | 100393327 | B1 | 10/2003 |
| KR | 200350504 | Y1 | 5/2004 |
| KR | 20040068292 | A | 7/2004 |
| KR | 200370872 | Y1 | 12/2004 |
| KR | 100636287 | B1 | 10/2006 |
| KR | 20070038350 | A | 4/2007 |
| KR | 100757450 | B1 | 9/2007 |
| KR | 20070096027 | A | 10/2007 |
| KR | 20080060218 | A | 7/2008 |
| KR | 100971178 | B1 | 7/2010 |
| KR | 20100135865 | A | 12/2010 |
| KR | 20120003484 | U | 5/2012 |
| KR | 20120104533 | A | 9/2012 |
| KR | 20130029697 | A | 3/2013 |
| KR | 20130006714 | U | 11/2013 |
| KR | 20140068808 | A | 6/2014 |
| KR | 20140123487 | A | 10/2014 |
| KR | 20150143877 | A | 12/2015 |
| KR | 20150143891 | A | 12/2015 |
| KZ | 26743 | B | 3/2013 |
| MX | 2009001096 | A | 3/2009 |
| MX | 2014011283 | A | 10/2014 |
| RU | 2008630 | C1 | 2/1994 |
| RU | 2066337 | C1 | 9/1996 |
| RU | 2098446 | C1 | 12/1997 |
| RU | 2135054 | C1 | 8/1999 |
| RU | 2282835 | C2 | 8/2006 |
| RU | 2285028 | C1 | 10/2006 |
| RU | 2302806 | C2 | 7/2007 |
| RU | 2311859 | C2 | 12/2007 |
| RU | 2336001 | C2 | 10/2008 |
| RU | 2349234 | C2 | 3/2009 |
| RU | 2371886 | C1 | 10/2009 |
| RU | 89927 | U1 | 12/2009 |
| RU | 94815 | U1 | 6/2010 |
| RU | 103281 | U1 | 4/2011 |
| RU | 115629 | U1 | 5/2012 |
| RU | 122000 | U1 | 11/2012 |
| RU | 122254 | U1 | 11/2012 |
| RU | 124120 | U1 | 1/2013 |
| RU | 2474759 | C1 | 2/2013 |
| RU | 132318 | U1 | 9/2013 |
| RU | 2509516 | C2 | 3/2014 |
| RU | 2517125 | C2 | 5/2014 |
| RU | 2015105675 | A | 8/2015 |
| RU | 2013155697 | A | 10/2015 |
| RU | 2614615 | C2 | 3/2017 |
| RU | 2016150117 | A | 6/2018 |
| RU | 2687811 | C1 | 5/2019 |
| SE | 7415242 | L | 6/1975 |
| SE | 0502503 | L | 10/2006 |
| TW | 274507 | B | 4/1996 |
| TW | 201325481 | A | 7/2013 |
| WO | 8404698 | A1 | 12/1984 |
| WO | 8601730 | A1 | 3/1986 |
| WO | 8602528 | A1 | 5/1986 |
| WO | 9013326 | A1 | 11/1990 |
| WO | 9406314 | A1 | 3/1994 |
| WO | 9409842 | A1 | 5/1994 |
| WO | 9418860 | A1 | 9/1994 |
| WO | 9527411 | A1 | 10/1995 |
| WO | 9632854 | A2 | 10/1996 |
| WO | 9639880 | A1 | 12/1996 |
| WO | 9748293 | A1 | 12/1997 |
| WO | 9805906 | A1 | 2/1998 |
| WO | 9817131 | A1 | 4/1998 |
| WO | 9823171 | A1 | 6/1998 |
| WO | 9835552 | A1 | 8/1998 |
| WO | 9914402 | A1 | 3/1999 |
| WO | 9947273 | A2 | 9/1999 |
| WO | 9947806 | A2 | 9/1999 |
| WO | 0009188 | A1 | 2/2000 |
| WO | 0021598 | A1 | 4/2000 |
| WO | 0028842 | A1 | 5/2000 |
| WO | 0028843 | A1 | 5/2000 |
| WO | 0045878 | A2 | 8/2000 |
| WO | 0050111 | A1 | 8/2000 |
| WO | 0104548 | A1 | 1/2001 |
| WO | 0140717 | A1 | 6/2001 |
| WO | 0163183 | A1 | 8/2001 |
| WO | 0167819 | A1 | 9/2001 |
| WO | 0205620 | A2 | 1/2002 |
| WO | 0205640 | A1 | 1/2002 |
| WO | 0206421 | A1 | 1/2002 |
| WO | 0207656 | A2 | 1/2002 |
| WO | 0224262 | A2 | 3/2002 |
| WO | 02051466 | A2 | 7/2002 |
| WO | 02051468 | A2 | 7/2002 |
| WO | 02058747 | A1 | 8/2002 |
| WO | 02096532 | A1 | 12/2002 |
| WO | 02098389 | A1 | 12/2002 |
| WO | 03012565 | A1 | 2/2003 |
| WO | 03028409 | A1 | 4/2003 |
| WO | 03037412 | A2 | 5/2003 |
| WO | 03049792 | A1 | 6/2003 |
| WO | 03050405 | A1 | 6/2003 |
| WO | 03056948 | A1 | 7/2003 |
| WO | 03059413 | A2 | 7/2003 |
| WO | 03070031 | A1 | 8/2003 |
| WO | 03083007 | A2 | 10/2003 |
| WO | 03083283 | A1 | 10/2003 |
| WO | 03101454 | A1 | 12/2003 |
| WO | 03103387 | A2 | 12/2003 |
| WO | 2004022128 | A2 | 3/2004 |
| WO | 2004022242 | A1 | 3/2004 |
| WO | 2004022243 | A1 | 3/2004 |
| WO | 2004089126 | A1 | 10/2004 |

(56) References Cited

FOREIGN PATENT DOCUMENTS

| | | | | |
|---|---|---|---|---|
| WO | 2004098324 | A2 | 11/2004 | |
| WO | 2004104491 | A2 | 12/2004 | |
| WO | 2004104492 | A2 | 12/2004 | |
| WO | 2004104493 | A2 | 12/2004 | |
| WO | 2005106350 | A2 | 11/2005 | |
| WO | 2006022714 | A1 | 3/2006 | |
| WO | 2006082571 | A1 | 8/2006 | |
| WO | 2007012007 | A2 | 1/2007 | |
| WO | 2007017482 | A1 | 2/2007 | |
| WO | 2007040941 | A1 | 4/2007 | |
| WO | 2007042941 | A2 | 4/2007 | |
| WO | 2007051163 | A2 | 5/2007 | |
| WO | 2007054167 | A1 | 5/2007 | |
| WO | 2007078273 | A1 | 7/2007 | |
| WO | 2007090594 | A1 | 8/2007 | |
| WO | 2007098337 | A2 | 8/2007 | |
| WO | 2007109811 | A2 | 9/2007 | |
| WO | 2007113617 | A2 | 10/2007 | |
| WO | 2007116915 | A1 | 10/2007 | |
| WO | 2007131449 | A1 | 11/2007 | |
| WO | 2007131450 | A1 | 11/2007 | |
| WO | 2007141668 | A2 | 12/2007 | |
| WO | 2008015441 | A1 | 2/2008 | |
| WO | 2008029381 | A2 | 3/2008 | |
| WO | 2008038144 | A2 | 4/2008 | |
| WO | 2008051909 | A1 | 5/2008 | |
| WO | 2008069883 | A1 | 6/2008 | |
| WO | 2008108889 | A1 | 9/2008 | |
| WO | 2008121610 | A1 | 10/2008 | |
| WO | 2008151777 | A2 | 12/2008 | |
| WO | 2009001082 | A1 | 12/2008 | |
| WO | 2009006521 | A2 | 1/2009 | |
| WO | 2009015410 | A1 | 2/2009 | |
| WO | 2009022232 | A2 | 2/2009 | |
| WO | 2009042955 | A2 | 4/2009 | |
| WO | 2009079641 | A2 | 6/2009 | |
| WO | 2009092862 | A1 | 7/2009 | |
| WO | 2009118085 | A1 | 10/2009 | |
| WO | 2009132793 | A1 | 11/2009 | |
| WO | 2009152651 | A1 | 12/2009 | |
| WO | 2009155957 | A1 | 12/2009 | |
| WO | 2009156181 | A2 | 12/2009 | |
| WO | 2010017586 | A1 | 2/2010 | |
| WO | 2010041354 | A1 | 4/2010 | |
| WO | 2010045670 | A1 | 4/2010 | |
| WO | 2010045671 | A1 | 4/2010 | |
| WO | 2010047389 | A1 | 4/2010 | |
| WO | 2010053467 | A1 | 5/2010 | |
| WO | 2010060537 | A1 | 6/2010 | |
| WO | 2010073018 | A1 | 7/2010 | |
| WO | 2010102832 | A1 | 9/2010 | |
| WO | 2010107613 | A1 | 9/2010 | |
| WO | 2010118644 | A1 | 10/2010 | |
| WO | 2010133342 | A1 | 11/2010 | |
| WO | 2011045609 | A1 | 4/2011 | |
| WO | 2011050943 | A1 | 5/2011 | |
| WO | 2011050964 | A1 | 5/2011 | |
| WO | 2011063970 | A1 | 6/2011 | |
| WO | 2011068020 | A1 | 6/2011 | |
| WO | 2011070785 | A1 | 6/2011 | |
| WO | 2011079932 | A1 | 7/2011 | |
| WO | 2011088132 | A1 | 7/2011 | |
| WO | 2011101164 | A1 | 8/2011 | |
| WO | 2011109304 | A2 | 9/2011 | |
| WO | 2011109849 | A1 | 9/2011 | |
| WO | 2011117580 | A2 | 9/2011 | |
| WO | 2012014490 | A1 | 2/2012 | |
| WO | 2012025496 | A1 | 3/2012 | |
| WO | 2012054973 | A1 | 5/2012 | |
| WO | 2012072770 | A1 | 6/2012 | |
| WO | 2012072790 | A1 | 6/2012 | |
| WO | 2012078865 | A2 | 6/2012 | |
| WO | 2012100430 | A1 | 8/2012 | |
| WO | 2013022936 | A1 | 2/2013 | |
| WO | 2013034453 | A1 | 3/2013 | |
| WO | 2013034454 | A1 | 3/2013 | |
| WO | 2013034455 | A1 | 3/2013 | |
| WO | 2013034458 | A1 | 3/2013 | |
| WO | 2013034459 | A1 | 3/2013 | |
| WO | 2013034460 | A1 | 3/2013 | |
| WO | 2013057185 | A1 | 4/2013 | |
| WO | 2013076098 | A2 | 5/2013 | |
| WO | 2013082173 | A1 | 6/2013 | |
| WO | 2013098395 | A1 | 7/2013 | |
| WO | 2013098405 | A2 | 7/2013 | |
| WO | 2013098409 | A1 | 7/2013 | |
| WO | 2013098410 | A2 | 7/2013 | |
| WO | 2013102609 | A2 | 7/2013 | |
| WO | 2013113612 | A1 | 8/2013 | |
| WO | 2013116558 | A1 | 8/2013 | |
| WO | 2013116572 | A1 | 8/2013 | |
| WO | 2013131763 | A1 | 9/2013 | |
| WO | 2013131764 | A1 | 9/2013 | |
| WO | 2013152873 | A1 | 10/2013 | |
| WO | 2013160112 | A2 | 10/2013 | |
| WO | 2013178767 | A1 | 12/2013 | |
| WO | 2014012906 | A1 | 1/2014 | |
| WO | 2014037794 | A2 | 3/2014 | |
| WO | 2014045025 | A2 | 3/2014 | |
| WO | 2014048475 | A1 | 4/2014 | |
| WO | 2014048745 | A1 | 4/2014 | |
| WO | 2014061477 | A1 | 4/2014 | |
| WO | 2014102092 | A1 | 7/2014 | |
| WO | 2014130695 | A1 | 8/2014 | |
| WO | 2014140320 | A1 | 9/2014 | |
| WO | 2014147114 | A1 | 9/2014 | |
| WO | 2014150131 | A1 | 9/2014 | |
| WO | 2014201432 | A1 | 12/2014 | |
| WO | 2015022320 | A2 | 2/2015 | |
| WO | 2015022321 | A1 | 2/2015 | |
| WO | 2015051646 | A1 | 4/2015 | |
| WO | 2015052192 | A1 | 4/2015 | |
| WO | 2015062983 | A2 | 5/2015 | |
| WO | 2015068936 | A1 | 5/2015 | |
| WO | 2015082648 | A1 | 6/2015 | |
| WO | 2015082649 | A1 | 6/2015 | |
| WO | 2015082651 | A1 | 6/2015 | |
| WO | 2015082652 | A1 | 6/2015 | |
| WO | 2015114328 | A1 | 8/2015 | |
| WO | 2015131058 | A1 | 9/2015 | |
| WO | 2015140312 | A1 | 9/2015 | |
| WO | 2015165812 | A1 | 11/2015 | |
| WO | 2015175568 | A1 | 11/2015 | |
| WO | 2015177043 | A1 | 11/2015 | |
| WO | 2015177044 | A1 | 11/2015 | |
| WO | 2015177045 | A1 | 11/2015 | |
| WO | 2015177252 | A1 | 11/2015 | |
| WO | 2015177254 | A1 | 11/2015 | |
| WO | 2015177255 | A1 | 11/2015 | |
| WO | 2015177256 | A1 | 11/2015 | |
| WO | 2015177257 | A1 | 11/2015 | |
| WO | 2015177263 | A1 | 11/2015 | |
| WO | 2015177264 | A1 | 11/2015 | |
| WO | 2015177265 | A1 | 11/2015 | |
| WO | WO-2015177294 | A1 * | 11/2015 | ............. A24B 15/12 |
| WO | 2015198015 | A1 | 12/2015 | |
| WO | 2016014652 | A1 | 1/2016 | |
| WO | 2016075436 | A1 | 5/2016 | |
| WO | 2016156500 | A1 | 10/2016 | |
| WO | 2016184928 | A1 | 11/2016 | |
| WO | 2016184929 | A1 | 11/2016 | |
| WO | 2016184930 | A1 | 11/2016 | |
| WO | 2016200815 | A2 | 12/2016 | |
| WO | 2017001819 | A1 | 1/2017 | |
| WO | 2017005705 | A1 | 1/2017 | |
| WO | 2017029268 | A1 | 2/2017 | |
| WO | 2017029269 | A1 | 2/2017 | |
| WO | 2017029270 | A1 | 2/2017 | |
| WO | 2017036950 | A2 | 3/2017 | |
| WO | 2017036955 | A2 | 3/2017 | |
| WO | 2017036959 | A1 | 3/2017 | |
| WO | 2017068094 | A1 | 4/2017 | |
| WO | 2017068098 | A1 | 4/2017 | |
| WO | 2017068099 | A1 | 4/2017 | |

(56) References Cited

FOREIGN PATENT DOCUMENTS

| | | | |
|---|---|---|---|
| WO | 2017072145 | A1 | 5/2017 |
| WO | 2017085242 | A1 | 5/2017 |
| WO | 2017149093 | A1 | 9/2017 |
| WO | 2017194769 | A1 | 11/2017 |
| WO | 2017205692 | A1 | 11/2017 |
| WO | 2017207581 | A1 | 12/2017 |
| WO | 2018002083 | A1 | 1/2018 |
| WO | 2018073376 | A1 | 4/2018 |
| WO | 2018178095 | A1 | 10/2018 |
| WO | 2020047417 | A1 | 3/2020 |

OTHER PUBLICATIONS

"Transformers of induction heating" UIHM. Mar. 27, 2013 [online] [retrieved on Jul. 12, 2024]. Retrieved from: https://www.uihm.com/en/Induction-Heating-Technology/TRANSFORMERS-of-induction-heating863.html (Year: 2013).*
"A Vacuum Insulation that is Ultrathin", Chemical Engineering , Aug. 1, 2011 , 5 pages.
"Atomization Device Applicable to Solid Tobacco Materials and Electronic Cigarette", CN203762288U, retrieved from Google Patents <https://patents.google.com/patenUCN203762288U/en> on Jan. 12, 2018 , 10 pages.
"Brief Communication for European Application No. 12750765.5, mailed on Aug. 31, 2021".
"Chinese First Office Action for Chinese Application No. 200980152395.4 date issued Dec. 3, 2012".
"Communication of a Notice of Opposition for European Patent Application No. 13716763.1 mailed on Nov. 25, 2020".
"Communication pursuant to Article 94(3) EPC for Application No. 16766233.7 mailed on Mar. 7, 2022".
"Communication Pursuant to Article 94(3) EPC for Application No. 16766234.5 mailed on Mar. 7, 2022".
"Communication pursuant to Article 94(3) EPC for Application No. 20202673.8, mailed on Aug. 12, 2022".
"Communication pursuant to Article 94(3) EPC for Application No. 22155465.2, mailed on Aug. 5, 2022".
"Decision to Dismiss an Amendment received for Korean Patent Application No. 10-2017-7008071, mailed on Mar. 20, 2019".
"Decision to Grant a Patent received for Japanese Application No. 2015-506185 filed Apr. 11, 2013, mailed on Nov. 15, 2016".
"Decision to Grant received for Japanese Patent Application No. 2011-532464, mailed on Aug. 5, 2014".
"Decision to Grant received for Japanese Patent Application No. 2016-134648, mailed May 22, 2018".
"Decision to Grant received for Japanese Patent Application No. 2020-182759, mailed Apr. 5, 2022".
"Decision to Grant received for Russian Patent Application No. 2011120430, mailed on Apr. 1, 2014".
"Decision to Grant received for Russian Patent Application No. 2014120213, mailed on Oct. 26, 2016".
"European Notice of Opposition, Application No. 13759537.7, dated Jan. 23, 2020".
"European Search Report for received for European Patent Application No. 22155465.2, dated Jul. 25, 2022".
"European Search Report received for European Patent Application No. 16166656.5 dated Oct. 11, 2016".
"Examination Report received for Australian Patent Application No. 2016204192, mailed on Feb. 21, 2018".
"Examination Report received for Australian Patent Application No. 2020294182, mailed on Mar. 5, 2022".
"Examination Report received for Canadian Application No. 2,845,754, mailed on Aug. 19, 2021".
"Examination Report received for Canadian Patent Application No. 2,845,754, mailed on Nov. 4, 2020".
"Examination Report received for Indian Patent Application No. 201947043640, mailed on Aug. 11, 2020".
"Examination Report received for Indonesian Patent Application No. P00201908524, mailed on Dec. 24, 2021".
"Examination Report received for Indonesian Patent Application No. P00201908525, mailed on Dec. 24, 2021".
"Examination Report received for New Zealand Patent Application No. 718007, mailed on Aug. 1, 2016".
"Examination Report received for Philippines Patent Application No. Jan. 2016/500805, mailed on Jan. 9, 2019".
"Extended European Search Report for Application No. 20179569.7 mailed on Oct. 2, 2020".
"Extended European Search Report for Application No. 20205057.1, mailed on Oct. 19, 2021".
"Extended European Search Report for Application No. EP20205075.3, mailed on Jan. 27, 2021".
"Extended European Search Report received for European Application No. 15178588.8, mailed on Apr. 22, 2016".
"Extended European Search Report received for European Patent Application No. 15200661.5, mailed on May 18, 2016".
"Extended European Search Report received for European Patent Application No. 18157257.9, mailed on Jun. 28, 2018".
"Extended European Search Report received for European Patent Application No. 18205608.5, mailed on Jul. 12, 2019".
"Extended European Search Report received for European Patent Application No. 19164405.3, mailed on Aug. 28, 2019".
"Extended European Search Report received for European Patent Application No. 19165045.6 mailed on Sep. 6, 2019".
"Extended European Search Report received for European Patent Application No. 19216472.1 mailed on Apr. 22, 2020".
"Extended European Search Report received for European Patent Application No. 20157622.0, mailed on May 28, 2020".
"Extended European Search Report received for European Patent Application No. 20205043.1, mailed on May 4, 2021".
"Extended European Search Report received for European Patent Application No. 20205071.2, mailed on Jul. 16, 2021".
"Extended European Search Report received for European Patent Application No. 20206770.8, mailed on Mar. 3, 2021".
"Extended European Search Report received for European Patent Application No. 21170791.4, mailed on Jun. 28, 2022".
"Extended European Search Report received for European Patent Application No. 21170804.5, mailed on Feb. 21, 2022".
"Extended European Search Report received for European Patent Application No. 21171022.3, mailed on Dec. 3, 2021".
"Extended European Search Report received for European Patent Application No. 21192233.1, mailed on Dec. 9, 2021".
"Extended European Search Report received for European Patent Application No. 22189790.3, mailed on Jan. 24, 2023".
"Extended European Search Report received for European Patent Application No. 17189951.1, mailed on Jan. 4, 2018".
"Extended European Search Report received for European Patent Application No. 20205544.8 mailed on Jun. 14, 2021".
"First Office Action filed Apr. 11, 2011 received for Chinese Application No. 201380021387.2, mailed on Dec. 3, 2015".
"Fourth Office Action and Search Report for Chinese Application No. 201680049858.4 mailed on Jan. 6, 2022".
"Fourth Office Action and Search Report received for Chinese Application No. 201680049479.5 mailed on Nov. 18, 2021".
"International Preliminary Report on Patentability for Application No. PCT/GB2015/051213 mailed on Jul. 14, 2016".
"International Preliminary Report on Patentability for Application No. PCT/AT2012/000017, issued on Aug. 13, 2013".
"International Preliminary Report on Patentability for Application No. PCT/EP2012/066484, mailed on Mar. 20, 2014".
"International Preliminary Report on Patentability for Application No. PCT/EP2012/066485, completed on Dec. 20, 2013".
"International Preliminary Report on Patentability for Application No. PCT/EP2012/066486, completed on Oct. 22, 2013".
"International Preliminary Report on Patentability for Application No. PCT/EP2012/066523, completed on Nov. 4, 2013".
"International Preliminary Report on Patentability for Application No. PCT/EP2012/066524, completed on Oct. 17, 2013".
"International Preliminary Report on Patentability for Application No. PCT/EP2012/066525, completed on Mar. 20, 2014".
"International Preliminary Report on Patentability for Application No. PCT/EP2012/070647, mailed on May 1, 2014".

(56) References Cited

OTHER PUBLICATIONS

"International Preliminary Report on Patentability for Application No. PCT/EP2013/057539, mailed on Nov. 6, 2014".
"International Preliminary Report on Patentability for Application No. PCT/EP2013/068797, issued on Mar. 31, 2015".
"International Preliminary Report on Patentability for Application No. PCT/EP2014/063785, completed on Jun. 1, 2015".
"International Preliminary Report on Patentability for Application No. PCT/EP2014/072828, mailed on May 12, 2016".
"International Preliminary Report on Patentability for Application No. PCT/EP2015/064595, mailed on Oct. 25, 2016".
"International Preliminary Report on Patentability for Application No. PCT/EP2016/070176, mailed on Mar. 15, 2018".
"International Preliminary Report on Patentability for Application No. PCT/EP2016/070178, mailed on Mar. 15, 2018".
"International Preliminary Report on Patentability for Application No. PCT/EP2016/070182, mailed on Mar. 15, 2018".
"International Preliminary Report on Patentability for Application No. PCT/EP2016/070185, mailed on Mar. 15, 2018".
"International Preliminary Report on Patentability for Application No. PCT/EP2016/070188, mailed on Mar. 15, 2018".
"International Preliminary Report on Patentability for Application No. PCT/EP2016/070191, mailed on Mar. 15, 2018".
"International Preliminary Report on Patentability for Application No. PCT/EP2016/075734, mailed on May 11, 2018".
"International Preliminary Report on Patentability for Application No. PCT/EP2016/075739, completed on Jan. 16, 2018".
"International Preliminary Report on Patentability for Application No. PCT/EP2018/057834, mailed on Oct. 10, 2019".
"International Preliminary Report on Patentability for Application No. PCT/EP2018/057835 mailed on Oct. 10, 2019".
"International Preliminary Report on Patentability for Application No. PCT/GB2013/052433, issued on Mar. 24, 2015".
"International Preliminary Report on Patentability for Application No. PCT/GB2014/051332, mailed on Nov. 12, 2015".
"International Preliminary Report on Patentability for Application No. PCT/GB2014/051333, completed on Aug. 5, 2015".
"International Preliminary Report on Patentability for Application No. PCT/GB2014/051334, mailed on Nov. 12, 2015".
"International Preliminary Report on Patentability for Application No. PCT/GB2017/051139, completed on Aug. 6, 2018".
"International Preliminary Report on Patentability for Application No. PCT/US2012/066523, mailed on Jun. 4, 2015".
"International Search Report and Written Opinion for Application No. PCT/AT2011/000123, mailed on Jul. 18, 2011".
"International Search Report and Written Opinion for Application No. PCT/EP2012/066484, mailed on Jan. 9, 2013".
"International Search Report and Written Opinion for Application No. PCT/EP2012/066485, mailed on Dec. 10, 2012".
"International Search Report and Written Opinion for Application No. PCT/EP2012/066486, mailed on Jan. 14, 2013".
"International Search Report and Written Opinion for Application No. PCT/EP2012/066523, mailed on Jan. 9, 2013".
"International Search Report and Written Opinion for Application No. PCT/EP2012/066524, mailed on Jan. 9, 2013".
"International Search Report and Written Opinion for Application No. PCT/EP2012/066525, mailed on Jan. 9, 2013".
"International Search Report and Written Opinion for Application No. PCT/EP2013/057539, mailed on Feb. 11, 2014".
"International Search Report and Written Opinion for Application No. PCT/EP2013/068797, mailed on Dec. 9, 2013".
"International Search Report and Written Opinion for Application No. PCT/EP2014/063785, mailed on Oct. 30, 2014".
"International Search Report and Written Opinion for Application No. PCT/EP2014/064365, mailed on Oct. 7, 2014".
"International Search Report and Written Opinion for Application No. PCT/EP2014/072828, mailed on Jun. 16, 2015".
"International Search Report and Written Opinion for Application No. PCT/EP2016/070176, mailed Apr. 19, 2017".
"International Search Report and Written Opinion for Application No. PCT/EP2016/070178, mailed Dec. 14, 2016".
"International Search Report and Written Opinion for Application No. PCT/EP2016/070182, mailed on Dec. 12, 2016".
"International Search Report and Written Opinion for Application No. PCT/EP2016/070185, mailed on Apr. 4, 2017".
"International Search Report and Written Opinion for Application No. PCT/EP2016/070188, mailed on Dec. 13, 2016".
"International Search Report and Written Opinion for Application No. PCT/EP2016/070191, mailed on Dec. 13, 2016".
"International Search Report and Written Opinion for Application No. PCT/EP2018/057834, mailed on Nov. 6, 2018".
"International Search Report and Written Opinion for Application No. PCT/GB2013/052433, mailed on Jun. 30, 2014".
"International Search Report and Written Opinion for Application No. PCT/GB2017/051139, mailed on Aug. 9, 2017".
"International Search Report and Written Opinion for Application No. PCT/US2019/049076, mailed on Dec. 18, 2019".
"International Search Report and Written Opinion received for PCT Application No. PCT/EP2012/003103, mailed on Nov. 26, 2012".
"International Search Report and Written Opinion received for PCT Application No. PCT/GB2014/051333, mailed on Jul. 17, 2014".
"International Search Report and Written Opinion received for PCT Application No. PCT/GB2014/051334 mailed Jul. 21, 2014".
"International Search Report and Written Opinion received for PCT Application No. PCT/US2012/066523, mailed on May 29, 2013".
"International Search Report and Written Opinion received for PCT Patent Application No. PCT/GB2014/051332, mailed on Jul. 21, 2014".
"International Search Report and Written Opinion received for PCT Patent Application No. PCT/EP2012/070647, mailed on Feb. 6, 2013".
"International Search Report and Written Opinion received for PCT Patent Application No. PCT/EP2016/075734, mailed on Apr. 6, 2017".
"International Search Report and Written Opinion received for PCT Patent Application No. PCT/EP2018/085686, mailed May 9, 2019".
"International Search Report and Written Opinion received for PCT Patent Application No. PCT/EP2020/056231, mailed on Jul. 15, 2020".
"International Search Report and Written Opinion received for PCT Patent Application No. PCT/AT2012/000017, mailed on Jul. 3, 2012".
"International Search Report and Written Opinion received for PCT Patent Application No. PCT/EP2018/057835, mailed on Nov. 6, 2018".
"International Search Report and Written Opinion, received for PCT Application No. PCT/EP2016/075739, mailed Feb. 24, 2017".
"International Search Report for corresponding International Application No. PCT/GB2015/051213 mailed on Jul. 16, 2015".
"International Search Report received for PCT Patent Application No. PCT/AT2009/000413 mailed on Jan. 25, 2010".
"International Search Report received for PCT Patent Application No. PCT/AT2009/000414 mailed on Jan. 26, 2010".
"International Search Report received for PCT Patent Application No. PCT/EP2015/064595, mailed on Jan. 5, 2016".
"Invitation to Pay Additional Fees for the PCT patent application No. PCT/EP2018/057834, mailed Jul. 13, 2018".
"Invitation to Pay Additional Fees for the PCT patent application No. PCT/EP2018/057835, mailed on Jul. 17, 2018".
"Japanese Office Action, Application No. 2018-521547, dated Jun. 25, 2019".
"Kapton (Polyimide) Flexible Heaters" , Kapton Flexible Heaters Guide, Available Online at <https://www.kapton-silicone-flexible-heaters.com/products/kapton_polyimide_flexible_heaters.html> , 2011 , 2 pages.
"Non-Final Office Action received for U.S. Appl. No. 16/948,553, mailed on Oct. 20, 2022".
"Notice of Opposition Letter from EPO Opposition against for EP2358418 mailed on Mar. 1, 2017".
"Notice of Opposition received for European Application No. 12750771.3, mailed on Jan. 11, 2019".

(56) References Cited

OTHER PUBLICATIONS

"Notice of Opposition received for European Patent Application No. 12750765.5, mailed Sep. 26, 2018".
"Notice of Opposition received for European Patent Application No. 12750770.5, mailed on Mar. 7, 2017".
"Notice of Opposition received for European Patent Application No. 12750771.3, mailed on Jan. 24, 2019".
"Notice of Opposition received for European Patent Application No. 12750771.3, mailed on Jan. 25, 2019".
"Notice of Opposition received for European Patent Application No. 18157257.9, mailed on Sep. 20, 2021".
"Notice of Reasons for Refusal mailed Nov. 2, 2021 for Japanese Application No. 2020-182712".
"Notice of Reasons for Refusal mailed Jan. 25, 2022 for Japanese Application No. 2020-183045".
"Notice of Reasons for Rejection for Japanese Application No. 2020-182759, dated Oct. 12, 2021".
"Notice of Reasons for Rejection for Japanese Application No. 2020-182762, mailed on Dec. 7, 2021".
"Notice of Reasons for Rejection mailed Jan. 25, 2022 for Japanese Application No. 2020-183046".
"Notification to Grant Patent Right received for Chinese Patent Application No. 201610086101.4, mailed on Oct. 25, 2018".
"Office Action and Search Report filed Aug. 24, 2012 for Chinese Patent Application No. 201280030681.5, mailed on Apr. 27, 2015".
"Office Action and Search Report filed Aug. 26, 2016 for Chinese Application No. 2016800498156, mailed on May 6, 2020".
"Office Action and Search Report filed Aug. 29, 2016 for Taiwan Application No. 105127626, mailed on Feb. 25, 2020".
"Office Action and Search Report received for Russian Patent Application No. 2020135861, mailed on Apr. 13, 2021".
"Office Action dated Oct. 18, 2019 for Chinese Application No. 201680049874.3".
"Office Action dated Aug. 5, 2020 for Chinese Application No. 201680049874.3".
"Office Action for Chinese Application No. 201680049479.5, mailed on Feb. 4, 2021".
"Office Action for Chinese Application No. 201680049858.4 mailed on Jul. 3, 2020".
"Office Action for Chinese Application No. 201680049858.4, mailed on Apr. 1, 2022".
"Office Action for Japanese Application No. 2020-067569, mailed on Nov. 9, 2021".
"Office Action for Japanese Application No. 2020-183056, mailed on Nov. 9, 2021".
"Office Action mailed Sep. 1, 2020 for Japanese Application No. 2018-506381".
"Office Action mailed Sep. 12, 2019 for Chilean Application No. 201800521".
"Office Action mailed May 15, 2020 for the Brazilian Application No. 112018004103.3".
"Office Action mailed Sep. 15, 2020 for Japanese Application No. 2019-118784".
"Office Action mailed Sep. 17, 2020 for Canadian Application No. 2996342".
"Office Action mailed Jun. 19, 2020 for Canadian Application No. 2995315".
"Office Action mailed Apr. 27, 2020 for the Brazilian Application No. 112017028539-8".
"Office Action mailed Sep. 29, 2020 for Japanese Application No. 2018-506563".
"Office Action mailed Dec. 3, 2019 for Japanese Application No. 2018-506381".
"Office action mailed Sep. 8, 2020 for Japanese Application No. 2018-507624".
"Office Action mailed Jun. 9, 2020 for Chinese Application No. 201680061969.7".
"Office Action received for Australian Patent Application No. 2020235037, mailed on May 26, 2022".
"Office Action received for Brazilian Patent Application No. 112014004818-5, mailed on May 10, 2020".
"Office Action received for Brazilian Patent Application No. 112018004103-3, mailed on Feb. 1, 2022".
"Office Action received for Brazilian Patent Application No. 112018004110-6, mailed on Jan. 31, 2022".
"Office Action received for Brazilian Patent Application No. 112018004110-6, mailed on Jun. 1, 2023".
"Office Action received for Canadian Patent Application No. 2995315, mailed on Feb. 19, 2019".
"Office Action received for Canadian Patent Application No. 2995315, mailed on Sep. 17, 2020".
"Office Action received for Canadian Patent Application No. 2996835, mailed on Feb. 14, 2019".
"Office Action received for Canadian Patent Application No. 3,057,903, mailed on Aug. 30, 2021".
"Office Action received for Canadian Patent Application No. 3,057,903, mailed on Dec. 15, 2020".
"Office Action received for Canadian Patent Application No. 3,057,905, mailed on Jan. 20, 2021".
"Office Action received for Canadian Patent Application No. 3003514, mailed on Mar. 28, 2019".
"Office Action received for Chinese Application No. 201680049874.3, mailed on Jan. 28, 2021".
"Office Action received for Chinese Patent Application No. 201480024988.3, mailed on Dec. 30, 2016".
"Office Action received for Chinese Patent Application No. 201280029784.X, mailed on Jun. 15, 2015".
"Office Action received for Chinese Patent Application No. 201380021387.2, mailed Jul. 8, 2016".
"Office Action received for Chinese Patent Application No. 2013800472843, mailed on Nov. 13, 2017".
"Office Action received for Chinese Patent Application No. 201380048636.7, mailed on May 5, 2016".
"Office Action received for Chinese Patent Application No. 201480024978.X mailed on Jan. 18, 2017".
"Office Action received for Chinese Patent Application No. 201480024988.3, mailed on Sep. 11, 2017".
"Office Action received for Chinese Patent Application No. 201480037049.2, mailed on May 9, 2017".
"Office Action received for Chinese Patent Application No. 201480059966.0, mailed on Dec. 26, 2017".
"Office Action received for Chinese Patent Application No. 201580022356.8, mailed on Jul. 18, 2018".
"Office Action received for Chinese Patent Application No. 201580034981.4, mailed on Aug. 3, 2018".
"Office Action received for Chinese Patent Application No. 201610086101.4, mailed on May 4, 2018".
"Office Action received for Chinese Patent Application No. 201610371843.1, mailed on Sep. 30, 2018".
"Office Action received for Chinese Patent Application No. 201610804046.8, mailed on Mar. 25, 2019".
"Office Action received for Chinese Patent Application No. 201680049679.0, mailed on Nov. 4, 2019".
"Office Action received for Chinese Patent Application No. 2016800498156, mailed on Oct. 21, 2019".
"Office Action received for Chinese Patent Application No. 201680049858.4, mailed on Jul. 1, 2021".
"Office Action received for Chinese Patent Application No. 201680049858.4, mailed on Nov. 1, 2019".
"Office Action received for Chinese Patent Application No. 201680049874.3, mailed on Mar. 20, 2023".
"Office Action received for Chinese Patent Application No. 20168009479.5 mailed on Apr. 15, 2022".
"Office Action received for Chinese Patent Application No. 201710412726.X, mailed on Apr. 24, 2019".
"Office Action received for Chinese Patent Application No. 201710413187.1, mailed on Apr. 24, 2019".
"Office Action received for Chinese Patent Application No. 201811073829.9, mailed Jan. 25, 2022".
"Office Action received for Chinese Patent Application No. 201811073829.9, mailed on May 8, 2021".

(56) References Cited

OTHER PUBLICATIONS

"Office Action received for Chinese Patent Application No. 201811073829.9, mailed on Sep. 15, 2021".
"Office Action received for Chinese Patent Application No. 201880023195.8, mailed on Apr. 21, 2021".
"Office Action received for Chinese Patent Application No. 201880023195.8, mailed on Dec. 17, 2021".
"Office Action received for Chinese Patent Application No. 201880023195.8, mailed on Jun. 21, 2022".
"Office Action received for European Patent Application No. 12750765.5, mailed on Sep. 25, 2018".
"Office Action received for European Patent Application No. 17189951.1, mailed on Jan. 25, 2019".
"Office Action received for European Patent Application No. 23164488.1, mailed on Sep. 26, 2023".
"Office Action received for Indian Patent Application No. 201647014549, mailed on Aug. 28, 2019".
"Office Action received for Japanese Application No. 2015-506185, mailed on Sep. 29, 2015".
"Office Action received for Japanese Application No. 2018-506553, mailed on Mar. 19, 2019".
"Office Action received for Japanese Application No. 2018-506575, mailed on Mar. 19, 2019".
"Office Action received for Japanese Application No. 2020-126181, mailed on Nov. 30, 2021".
"Office Action received for Japanese Application No. 2020-526233, mailed on Jun. 8, 2021".
"Office Action received for Japanese Patent Application No. 2014-519585, mailed on Mar. 31, 2015".
"Office Action received for Japanese Patent Application No. 2014-519586, mailed on Apr. 7, 2015".
"Office Action received for Japanese Patent Application No. 2016-522550, mailed on Jan. 31, 2017".
"Office Action received for Japanese Patent Application No. 2016-522550, mailed on Jul. 4, 2017".
"Office Action received for Japanese Patent Application No. 2016-522550, mailed on Nov. 14, 2017".
"Office Action received for Japanese Patent Application No. 2016-527295, mailed on Jun. 27, 2017".
"Office Action received for Japanese Patent Application No. 2016-564977, mailed on Dec. 5, 2017".
"Office Action received for Japanese Patent Application No. 2016-575543, mailed on Dec. 4, 2018".
"Office Action received for Japanese Patent Application No. 2017-017842, mailed on Dec. 12, 2017".
"Office Action received for Japanese Patent Application No. 2017-075527, mailed on Jan. 8, 2019".
"Office Action received for Japanese Patent Application No. 2017-075527, mailed on Mar. 13, 2018".
"Office Action received for Japanese Patent Application No. 2018-088088 mailed on Feb. 28, 2019".
"Office Action received for Japanese Patent Application No. 2018-506381, mailed on Apr. 13, 2021".
"Office Action received for Japanese Patent Application No. 2018-506381, mailed on Mar. 26, 2019".
"Office Action received for Japanese Patent Application No. 2018-506553, mailed on Nov. 5, 2019".
"Office Action received for Japanese Patent Application No. 2018-506563, mailed on May 7, 2019".
"Office Action received for Japanese Patent Application No. 2018-506565, mailed Nov. 5, 2019".
"Office Action received for Japanese Patent Application No. 2018-506575, mailed on Nov. 12, 2019".
"Office Action received for Japanese Patent Application No. 2018-507624, mailed on Feb. 13, 2019".
"Office Action received for Japanese Patent Application No. 2018-507624, mailed on Oct. 29, 2019".
"Office Action received for Japanese Patent Application No. 2018-519865, mailed on Jun. 25, 2019".
"Office Action received for Japanese Patent Application No. 2018-521547, mailed on Dec. 3, 2019".
"Office Action received for Japanese Patent Application No. 2019-065344, mailed on Jun. 16, 2020".
"Office Action received for Japanese Patent Application No. 2019-118784, mailed on Feb. 16, 2022".
"Office Action received for Japanese Patent Application No. 2019-551462, mailed on Dec. 15, 2020".
"Office Action received for Japanese Patent Application No. 2019-551471, mailed on Apr. 20, 2021".
"Office Action received for Japanese Patent Application No. 2019-551471, mailed on Dec. 15, 2020".
"Office Action received for Japanese Patent Application No. 2020-121066, mailed on Jun. 22, 2021".
"Office action received for Japanese Patent Application No. 2020-182327, mailed on Nov. 1, 2022".
"Office Action received for Japanese Patent Application No. 2021-074263, mailed on Jun. 14, 2022".
"Office Action received for Japanese Patent Application No. 2021-074266, mailed on Jul. 26, 2022".
"Office Action received for Japanese Patent Application No. 2022-132571, mailed on May 7, 2024".
"Office Action received for Japanese Patent Application No. 2018-506565, mailed on Mar. 19, 2019".
"Office Action received for Korean Patent Application No. 10-2013-7033866, mailed on Jul. 27, 2018".
"Office Action received for Korean Patent Application No. 10-2014-7032958, mailed on Aug. 17, 2016".
"Office Action received for Korean Patent Application No. 10-2016-7010831, mailed on Jul. 28, 2017".
"Office Action received for Korean Patent Application No. 10-2017-7008071, mailed on Mar. 20, 2019".
"Office Action received for Korean Patent Application No. 10-2017-7008071, mailed on May 11, 2018".
"Office Action received for Korean Patent Application No. 10-2017-7017425, mailed on Sep. 6, 2017".
"Office Action received for Korean Patent Application No. 10-2017-7017430, mailed on Sep. 6, 2017".
"Office Action received for Korean Patent Application No. 10-2018-7006009, mailed on Aug. 29, 2019".
"Office Action received for Korean Patent Application No. 10-2018-7006009, mailed on Jan. 31, 2019".
"Office Action received for Korean Patent Application No. 10-2018-7006070, mailed on Feb. 7, 2019".
"Office Action received for Korean Patent Application No. 10-2018-7006077, mailed on Feb. 8, 2019".
"Office Action received for Korean Patent Application No. 10-2018-7017575, mailed on Jan. 23, 2019".
"Office Action received for Korean Patent Application No. 10-2018-7019884, mailed on Apr. 5, 2019".
"Office Action received for Korean Patent Application No. 10-2019-7032076, mailed on May 25, 2021".
"Office Action Received for Korean Patent Application No. 1020197037986, mailed on Feb. 6, 2020".
"Office Action received for Korean Patent Application No. 10-2019-7038229, mailed on Jul. 19, 2022".
"Office Action received for Korean Patent Application No. 10-2020-7017740, mailed Feb. 8, 2022".
"Office Action received for Korean Patent Application No. 10-2020-7017746, mailed Feb. 10, 2022".
"Office Action received for Korean Patent Application No. 10-2020-7031372, mailed on Dec. 9, 2020".
"Office Action received for Korean Patent Application No. 10-2020-7036811, mailed on Apr. 14, 2021".
"Office Action received for Korean Patent Application No. 10-2021-7013743, mailed on Nov. 22, 2021".
"Office Action received for Korean Patent Application No. 10-2021-7020687, mailed on Sep. 14, 2023".
"Office Action received for Malaysian Patent Application No. PI2018700425, mailed on Sep. 27, 2023".
"Office Action received for Malaysian Patent Application No. PI2018001351, mailed on Sep. 30, 2021".

(56) References Cited

OTHER PUBLICATIONS

"Office Action received for Malaysian Patent Application No. PI2018700428, dated Mar. 1, 2021".
"Office Action received for Russian Application No. 2018115288, mailed on Oct. 17, 2018".
"Office Action received for Russian Application No. 2019113858, mailed on Sep. 5, 2022".
"Office Action received for Russian Patent Application No. 2015106592, mailed on Sep. 13, 2017".
"Office Action received for Russian Patent Application No. 2015146847, mailed on Sep. 22, 2017".
"Office Action received for Russian Patent Application No. 2016103729, mailed on Apr. 12, 2017".
"Office Action received for Russian Patent Application No. 2018101312, mailed on Jul. 4, 2018".
"Office Action received for Russian Patent Application No. 2019134684, mailed on May 27, 2020".
"Office Action received for Russian Patent Application No. 2020121132, mailed on Aug. 6, 2021".
"Office Action received for Russian Patent Application No. 2020134248, mailed on Mar. 29, 2024".
"Office Action received for Russian Patent Application No. 2020135756, mailed on Jun. 30, 2021".
"Office Action received for Russian Patent Application No. 2020135780, mailed on Feb. 28, 2024".
"Office Action received for Russian Patent Application No. 2020135831, mailed on Feb. 21, 2024".
"Office Action received for Russian Patent Application No. 2020135839, mailed on Mar. 19, 2024".
"Office Action received for Russian Patent Application No. 2020135848, mailed on Feb. 26, 2024".
"Office Action received for Russian Patent Application No. 2020135854, mailed on Feb. 29, 2024".
"Office Action received for Russian Patent Application No. 2021112978, mailed on Oct. 28, 2021".
"Office Action received for Russian Patent Application No. 2021126540, mailed on May 20, 2022".
"Office Action received for Taiwan Patent Application No. 105127627, mailed on Dec. 19, 2019".
"Office Action received for Ukrainian Patent Application No. 201801751, mailed on Feb. 15, 2021".
"Office Action received for Ukrainian Patent Application No. 201801846 mailed on Feb. 16, 2021".
"Partial European Search Report received for European Patent Application No. 20205057.1, mailed on Apr. 29, 2021".
"Partial European Search Report received for European Patent Application No. 21170791.4, mailed on Nov. 22, 2021".
"Polyetheretherketone", Online Catalog Source, available at <www.goodfellow.com/A/Polyethertherketone.html>, retrieved on Jan. 17, 2020 , 4 pages.
"Reason for Refusal received for Korean Patent Application No. 10-2021-7020659, mailed Sep. 22, 2023".
"Reason for Refusal received for Korean Patent Application No. 10-2021-7020661, mailed Sep. 22, 2023".
"Reason for Rejection received for Japanese Patent Application No. 2022-132571, mailed on Oct. 24, 2023".
"Reasons for Refusal Received for Japanese Patent Application No. 2015-531544, mailed on Feb. 1, 2016".
"Reasons for Refusal received for Japanese Patent Application No. 2020126181, mailed on May 18, 2021".
"Reasons for Refusal received for Japanese Patent Application No. 2020-175447, mailed on Aug. 2, 2022".
"Reasons for Refusal received for Japanese Patent Application No. 2020-181532, mailed on Jan. 17, 2023".
"Reasons for Refusal received for Japanese Patent Application No. 2022-140921, mailed on Apr. 23, 2024".
"Reasons for Refusal received for Japanese Patent Application No. 2023-000429, mailed on Apr. 2, 2024".
"Reasons for Rejection received for Japanese Patent Application No. 2015-137361, mailed on May 31, 2016".
"Reasons for Rejection received for Japanese Patent Application No. 2011-532464, mailed on Oct. 7, 2013".
"Reasons for Rejection received for Japanese Patent Application No. 2014-179732, mailed on Sep. 8, 2015".
"Reasons for Rejection received for Japanese Patent Application No. 2016-134648 mailed May 23, 2017".
"Reasons for Rejection received for Japanese Patent Application No. 2020-181532, mailed on Jun. 21, 2022".
"Reasons for Rejection received for Japanese Patent Application No. 2020-181533, mailed on Apr. 26, 2022".
"Reasons for Rejection received for Japanese Patent Application No. 2021-078359, mailed on Jun. 28, 2022".
"Reasons for Rejection received for Japanese Patent Application No. 2022-013252, mailed on Apr. 26, 2022".
"Reasons for Rejection received for Japanese Patent Application No. 2022-140921, mailed on Aug. 29, 2023".
"Reasons for Rejection received for Korean Patent Application No. 10-2021-7020159, mailed on Oct. 5, 2023".
"Reasons for Rejection received for Korean Patent Application No. 10-2021-7020688, mailed on Sep. 14, 2023".
"Scientific Principles" , University of Illinois, retrieved from: <http://matse1.matse.illinois.edu/ceramics/prin.html> , Jun. 15, 2017 , 13 pages.
"Search Report for Japanese Application No. 2020-521547, mailed on Jun. 14, 2019".
"Search Report received for Chinese Patent Application No. 201280029767.6, mailed on Mar. 24, 2015".
"Search Report received for Chinese Patent Application No. 201610086101.4, mailed on Apr. 25, 2018".
"Search Report received for European Patent Application No. 23164488.1, mailed on Sep. 14, 2023".
"Search Report received for Great Britain Patent Application No. 1216621.1, mailed on Jan. 17, 2013".
"Search Report received for Japanese Patent Application No. 2011-532464, mailed on Sep. 19, 2013".
"Search Report received for Japanese Patent Application No. 2014-179732, mailed on Aug. 25, 2015".
"Search Report received for Japanese Patent Application No. 2016-134648, mailed Mar. 28, 2017".
"Search Report received for Japanese Patent Application No. 2016-564977, mailed on Oct. 25, 2017".
"Search Report received for Russian Patent Application No. 2015146843/12 (072088), mailed on Apr. 24, 2017".
"Search Report received for Russian Patent Application No. 2018137501, mailed on Apr. 29, 2019".
"Second Office Action received for Chinese Patent Application No. 200980152395.4, mailed on Aug. 20, 2013".
"Second Office Action received for Chinese Patent Application No. 201380048636.7, mailed on Jan. 16, 2017".
"Summons to Attend Oral Proceedings pursuant to Rule 115(1) EPC received for European Application No. 18157257.9, mailed on May 24, 2022".
"Temperature-Sensitive Magnetic Alloys", NeoMax Materials Co. Ltd., Available Online at <http://www.neomax-materials.co.jp/eng/pr0510.htm> , Oct. 30, 2015 , 2 pages.
"The Opposition to Petition not to Grant of a Patent for the Vietnamese Patent Application No. 1-2014-03877, mailed on Jun. 29, 2018".
"Thermofoil™ Heaters", Minco Products Inc., Bulletin HS-202(B) , Jul. 22, 2004 , 60 pages.
"Vietnam Opposition for Application No. PCT/EP2013/057539, mailed on Apr. 27, 2018".
"Vietnam Opposition for Application No. PCT/EP2013/057539, mailed on Jun. 29, 2018".
"Welcome to Filtrona Porous Technologies" , Filtrona Richmond Inc., Available Online at <http://www.filtronaporoustechnologies.com> , Nov. 19, 2018 , 1 page.
"Written Opinion for PCT Patent Application No. PCT/GB2015/051213 mailed on Jul. 16, 2015".
"Written Opinion of the International Preliminary Examining Authority for Application No. PCT/EP2016/075739, mailed Sep. 28, 2017".

(56) References Cited

OTHER PUBLICATIONS

"Written Opinion of the International Preliminary Examining Authority Received for PCT Application No. PCT/EP2015/064595, mailed on Jun. 13, 2016".
"Written Opinion received for PCT Application No. PCT/EP2015/064595, mailed on Jan. 5, 2016".
"Written Opinion received for PCT Patent Application No. PCT/EP2012/066485, mailed on Oct. 15, 2013".
Abramov , et al. , "Application and File History for U.S. Appl. No. 15/991,512, filed May 29, 2018".
Abramov , et al. , "Application and File History for U.S. Appl. No. 14/343,368, filed Jun. 24, 2014".
Abramov , et al. , "Application and File History for U.S. Appl. No. 15/437,517, filed Feb. 21, 2017".
Abramov , et al. , "Application and File History for U.S. Appl. No. 15/437,522, filed Feb. 21, 2017".
Blandino , et al. , "Application and File History for U.S. Appl. No. 14/840,652, filed Aug. 31, 2015".
Blandino , et al. , "Application and File History for U.S. Appl. No. 14/840,731, filed Aug. 31, 2015".
Blandino , et al. , "Application and File History for U.S. Appl. No. 14/840,751, filed Aug. 31, 2015".
Blandino , et al. , "Application and File History for U.S. Appl. No. 14/840,854, filed Aug. 31, 2015".
Blandino , et al. , "Application and File History for U.S. Appl. No. 14/927,532, filed Oct. 30, 2015".
Blandino , et al. , "Application and File History for U.S. Appl. No. 14/927,539, filed Oct. 30, 2015".
Blandino , et al. , "Application and File History for U.S. Appl. No. 14/927,551, filed Oct. 30, 2015".
Blandino , et al. , "Application and File History for U.S. Appl. No. 14/927,556, filed Oct. 30, 2015."
Blandino , et al. , "Application and File History for U.S. Appl. No. 15/754,801, filed Feb. 23, 2018".
Blandino , et al. , "Application and File History for U.S. Appl. No. 15/754,812, filed Feb. 23, 2018".
Blandino , et al. , "Application and File History for U.S. Appl. No. 15/754,818, filed Feb. 23, 2018".
Blandino, et al. , "Application and File History for U.S. Appl. No. 15/754,823, filed Feb. 23, 2018".
Blandino , et al. , "Application and File History for U.S. Appl. No. 15/772,386, filed Apr. 30, 2018".
Brereton , et al. , "Application and File History for U.S. Appl. No. 14/899,629, filed Dec. 18, 2015".
Buchberger , "Application and File History for U.S. Appl. No. 13/583,381, filed Dec. 17, 2012".
Buchberger , "Application and File History for U.S. Appl. No. 15/470,078, filed Mar. 27, 2017".
Buchberger , "Application and File History for U.S. Appl. No. 15/470,089, filed Mar. 27, 2017".
Buchberger , "Application and File History for U.S. Appl. No. 15/470,095, filed Mar. 27, 2017".
Chalapud, Mayra C. , "Pectin Films with Recovered Sunflower Waves Produced by Electrospraying", Membranes, vol. 12, No. 560 , 17 pages.
Chaplin , "Hydrocolloids and Gums" , retrieved from: <http://www1.lsbu.ac.uk/water/hydrocolloids_gums.html> , Established in 2001.
Collier , et al. , "Mechanism of Evaporation and Condensation", Convective Boiling and Condensation, Third Edition, Clarendon Press , 1994 , 6 pages.
Concept Group , "Concept Group's New Thermal Insulator Thinner Than Human Hair", , 2 pages.
Concept Group , "Insulon® Thermal Barrier from Concept Group Blocks Heat with Hyper-Deep Vacuum™", , 1 page.
Concept Group , "New Super Insulator form Concept Group Stops Heat Conduction in Tight Spaces", https://www.businesswire.com/news/home/20110610006023/en/New-Super-Insulator-Concept-Group-Stops-Heat , 2011 , 5 pages.
Davies , et al. , "Metallic Foams: Their Production, Properties and Applications", Journal of Materials Science, vol. 18, Part 7 , 1983 , pp. 1899-1911.
Diener Electronic , "Plasma Technology", The Company Diener Electronic GmbH+Co. KG, www.plasma.de , Oct. 17, 2017 , 19 Pages.
Dunn , et al. , "Heat Pipes", 4th edition, ISBN 0080419038 , 1994 , 14 Pages.
Egoyants , et al. , "Application and File History for U.S. Appl. No. 14/127,138, filed Feb. 10, 2014".
Egoyants , et al. , "Application and File History for U.S. Appl. No. 14/127,144, filed Mar. 31, 2014".
Egoyants , et al. , "Application and File History for U.S. Appl. No. 14/127,148 filed Mar. 12, 2014".
Egoyants , et al. , "Application and File History for U.S. Appl. No. 14/127,879, filed May 9, 2014".
Egoyants , et al. , "Application and File History for U.S. Appl. No. 14/962,817, filed Dec. 8, 2015".
Egoyants , et al. , "Application and File History for U.S. Appl. No. 15/379,946, filed Dec. 15, 2016".
Excellup , "Solid State" , Available at <https://www.excellup.com/class_12/chemistry_12/SolidState4.aspx#:-:text=(a)%20Conductor%3A%20Solids%20having,considered%20as%20very%20good%20conductor> , 2023 , 6 pages.
GAOHE , "Chinese Scientific Information" , vol. 10 , May 15, 2010 , pp. 132-133.
Harding , et al. , "Application and File History for U.S. Appl. No. 14/902,663, filed Jan. 4, 2016".
Hatrick , et al. , "Application and File History for U.S. Appl. No. 14/428,626, filed Mar. 16, 2015".
Hegbom, Thor , "Integrating Electrical Heating Elements in Appliance Design", cited in EPO Opposition File Wrapper for EP2871983, resulting in interlocutory decision dated Aug. 7, 2019 , 4 pages.
Ineos , "Typical Engineering Properties of High Density Polyethylene", Olefins and Polymers, USA, retrieved from https://www.ineos.com/globalassets/ineos-group/businesses/ineos-olefins-and-polymers-USA/products/technical-information--patents/ineos-typical-engineering-properties-of-hdpe.pdf, Accessed Dec. 4, 2018.
Iorga , et al. , "Low Curie Temperature in Fe—Cr—Ni—Mn Alloys", U.P.B. Sci.Bull., Series B, vol. 73, Iss.4 , 2011 , pp. 195-202.
jrank.org , "Heat Capacity and Calorimetry, Heat Capacity and the Law of Conservation of Energy—Significance of the High Heat Capacity of Water", retrieved from https://science.jrank.org/pages/3265/Heat-Capacity.html, Accessed on Jun. 15, 2017.
Kaufman , et al. , "Application and File History for U.S. Appl. No. 14/927,529, filed Oct. 30, 2015".
Kaufman , et al. , "Application and File History for U.S. Appl. No. 14/927,537, filed Oct. 30, 2015".
Kaufman , et al. , "Application and File History for U.S. Appl. No. 15/772,382, filed Apr. 30, 2018".
Kynol , "Standard Specifications of Kynol Activated Carbon Fiber Products" , published by Kynol , Sep. 19, 2013 , 2 pages.
Merriam-Webster , "Definition of Film", Available at <https://www.merriam-webster.com/dictionary/Film> , Sep. 17, 2019 , 13 pages.
Patio Kits Direct , "Insulated Roof Panels", DIY Alumawood Patio Cover Kits, available at https://www.patiokitsdirect.com/about-insulation , Sep. 20, 2018 , 2 pages.
Physics , "Analysis Series of Typical Examples of College Entrance Examination", Editorial Board, Heilongjiang Science and Technology Press , Dec. 31, 1995 , 47 pages.
Rasidek , et al. , "Effect of Temperature on Rheology Behaviour of Banana Peel Pectin Extracted Using Hot Compressed Water", Jurnal Teknologi (Sciences & Engineering), vol. 80, No. 3 , Apr. 1, 2018 , pp. 97-103.
Rudolph, G , "The Influence of CO2 on the Sensory Characteristics of the Favor-System", BAT Cigarettenfabriken GmbH, http://legacy.library.ucsf.edu/tid/sla51f00 , 24 pages.
Saleem , et al. , "Application and File History for U.S. Appl. No. 14/382,198, filed Aug. 29, 2014".
Shuisheng , et al. , "Semisolid Processing Technology", Jinshu Bangutai Jiagong Jishu, ISBN 978-7-5024-5935-2 , 2012 , 10 pages.

(56) References Cited

OTHER PUBLICATIONS

Song , et al. , "Experimental and numerical study of the effect of coil structure on induction nitriding temperature field", Advances in Mechanical Engineering, vol. 12, No. 7 , Jul. 2020 , 19 pages.
The Engineering Toolbox , "Specific Heats for Metals", retrieved from https://www.engineeringtoolbox.com/specific-heat-metals-d_152.html , 2003 , 6 pages.
Todaka , et al. , "Low Curie Temperature Material for Induction Heating Self-Temperature Controlling System", Journal of Magnetism and Magnetic Materials 320 , 2008 , pp. e702-e707.
Vasiliev , et al. , "Application and File History for U.S. Appl. No. 14/127,133, filed Jul. 15, 2014".
Virginia, Richmond , "A Summary of Findings and Recommendations for the Flexible Heater", , Sep. 19, 1990 , 8 pages.
Warrier , et al. , "Effect of the Porous Structure of Graphite on Atomic Hydrogen Diffusion and Inventory", Nuclear Fusion, vol. 47 , 2007 , pp. 1656-1663.
Wilke , et al. , "Application and File History for U.S. Appl. No. 14/840,703, filed Aug. 31, 2015".
Wilke , et al. , "Application and File History for U.S. Appl. No. 14/840,972, filed Aug. 31, 2015".
Wilke , et al. , "Application and File History for U.S. Appl. No. 15/754,809, filed Feb. 23, 2018".
Wilke , et al. , "Application and File History for U.S. Appl. No. 15/754,837, filed Feb. 23, 2018".

* cited by examiner

ARTICLE FOR USE WITH APPARATUS FOR HEATING SMOKABLE MATERIAL

PRIORITY CLAIM

The present application is a Continuation Application of U.S. application Ser. No. 15/754,823 filed on Feb. 23, 2018, which is a National Phase entry of PCT Application No. PCT/EP2016/070188, filed on Aug. 26, 2016, which claims priority to U.S. patent application Ser. No. 14/840,854, filed on Aug. 31, 2015, which are hereby fully incorporated herein by reference.

TECHNICAL FIELD

The present disclosure relates to articles for use with apparatus for heating smokable material to volatilize at least one component of the smokable material, and to systems comprising such an article and such apparatus.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

A first aspect of the present disclosure provides an article for use with apparatus for heating smokable material to volatilize at least one component of the smokable material, the article comprising: a cavity configured to receive smokable material; and a coil of heater or heating material that is heatable by penetration with a varying magnetic field to thereby heat the cavity. In an exemplary embodiment, the article comprises a closed circuit of heating material that is heatable by penetration with a varying magnetic field, wherein the closed circuit comprises the coil.

In an exemplary embodiment, the coil is located in the cavity.

In an exemplary embodiment, the cavity is elongate, and the coil extends along a longitudinal axis that is substantially aligned with a longitudinal axis of the cavity.

In an exemplary embodiment, the heating material comprises one or more materials selected from the group consisting of: an electrically-conductive material, a magnetic material, and a non-magnetic material.

In respective exemplary embodiments, the heating material comprises a metal or a metal alloy.

In an exemplary embodiment, the heating material comprises one or more materials selected from the group consisting of: aluminum, gold, iron, nickel, cobalt, conductive carbon, graphite, plain-carbon steel, stainless steel, ferritic stainless steel, copper, and bronze.

In an exemplary embodiment, the heating material is susceptible to eddy currents being induced in the heating material when penetrated by a varying magnetic field.

In an exemplary embodiment, a first portion of the coil is more susceptible to eddy currents being induced therein by penetration with a varying magnetic field than a second portion of the coil.

In an exemplary embodiment, the article comprises a container defining the cavity.

In an exemplary embodiment, the container is free of material that is heatable by penetration with a varying magnetic field.

In an exemplary embodiment, at least a portion of the container is transparent or translucent.

In an exemplary embodiment, the container is made of glass or a plastics material.

In an exemplary embodiment, the coil is in a fixed position relative to the cavity.

In an exemplary embodiment, the coil is removable from the article.

In an exemplary embodiment, the article comprises the smokable material in the cavity.

In an exemplary embodiment, the heating material is in contact with the smokable material.

In an exemplary embodiment, the smokable material comprises tobacco and/or one or more humectants.

In an exemplary embodiment, the article comprises a mouthpiece defining a passageway that is in fluid communication with the cavity.

In an exemplary embodiment, the article comprises a passageway for fluidly connecting the cavity with an exterior of the article, and an actuator operable to vary a cross sectional area of the passageway.

In an exemplary embodiment, the cavity is sealed from an exterior of the article.

In an exemplary embodiment, the article comprises an air-permeable membrane for admitting air into the cavity from an exterior of the article.

In an exemplary embodiment, the article comprises a seal between the air-permeable membrane and the exterior of the article, wherein the seal seals the air-permeable membrane from the exterior of the article, and wherein the seal is breakable or removable from the article to place the air-permeable membrane in fluid communication with the exterior of the article during use.

In an exemplary embodiment, the article comprises a vapor permeable membrane for permitting vapor generated in the cavity to pass to an exterior of the article during use.

In an exemplary embodiment, the article comprises a seal between the vapor permeable membrane and the exterior of the article, wherein the seal seals the vapor permeable membrane from the exterior of the article, and wherein the seal is breakable or removable from the article to place the vapor permeable membrane in fluid communication with the exterior of the article during use.

In an exemplary embodiment, the article comprises a mass of thermal insulation around the cavity. The thermal insulation may comprise one or more materials selected from the group consisting of: aerogel, vacuum insulation, wadding, fleece, non-woven material, non-woven fleece, woven material, knitted material, nylon, foam, polystyrene, polyester, polyester filament, polypropylene, a blend of polyester and polypropylene, cellulose acetate, paper or card, and corrugated material such as corrugated paper or card.

In an exemplary embodiment, the article comprises a coating on the coil that is smoother or harder than a surface of the coil.

In an exemplary embodiment, the article comprises a catalytic material on at least a portion of the coil.

In an exemplary embodiment, the article comprises a temperature detector for detecting a temperature of the cartridge. In some embodiments, the article comprises one or more terminals connected to the temperature detector for making connection with a temperature monitor of the apparatus in use.

In an exemplary embodiment, the coil of the article is a first coil, and the article comprises a second coil of heating material that is heatable by penetration with a varying magnetic field to heat the cavity.

A second aspect of the present disclosure provides a system, comprising: an article according to the first aspect of the present disclosure; and apparatus having an interface for cooperating with the article, and a magnetic field generator comprising a coil for generating a varying magnetic field for penetrating the coil of the article when the interface is cooperating with the article; wherein an impedance of the coil of the magnetic field generator is equal, or substantially equal, to an impedance of the coil of the article.

In an exemplary embodiment, the interface comprises a recess for receiving at least a portion of the article.

In an exemplary embodiment, the recess is elongate, and the coil of the magnetic field generator extends along a longitudinal axis that is substantially aligned with a longitudinal axis of the recess.

BRIEF DESCRIPTION OF THE DRAWINGS

Embodiments of the disclosure will now be described, by way of example only, with reference to the accompanying drawings, in which.

DETAILED DESCRIPTION

Figure 1:
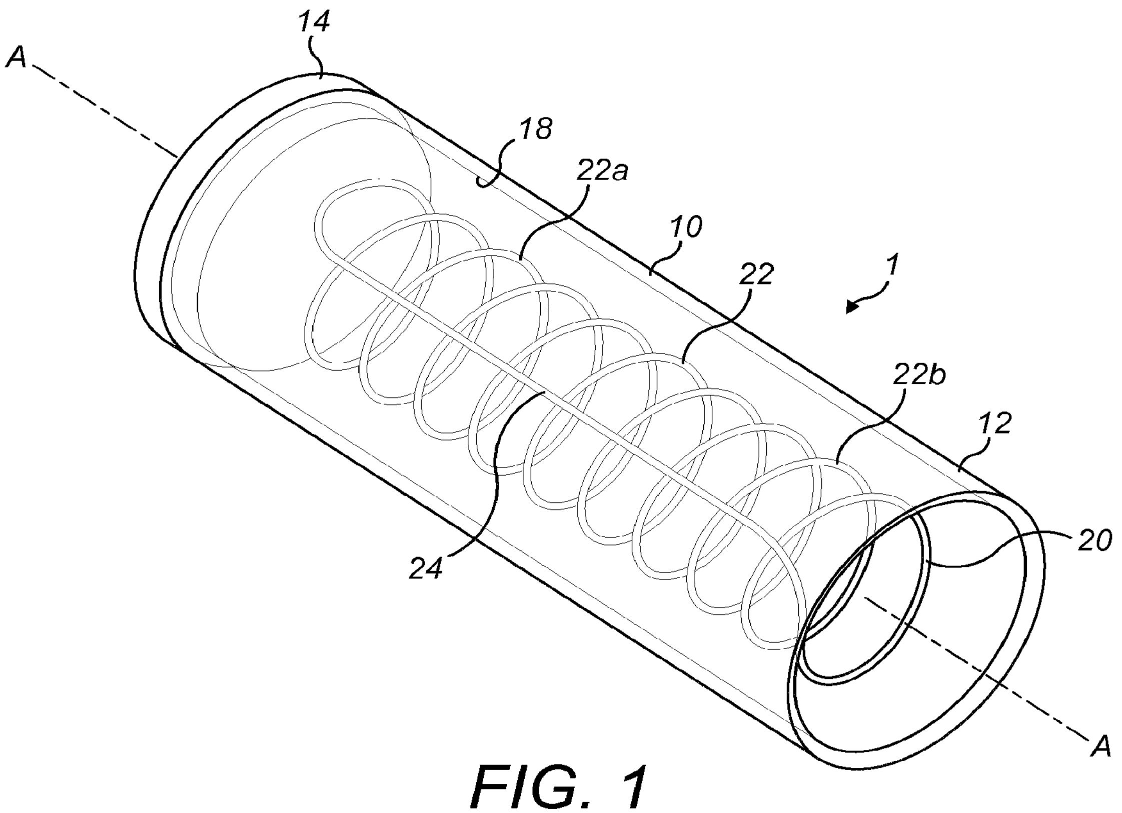
FIG. 1 shows a schematic perspective view of an example of an article for use with apparatus for heating smokable material to volatilize at least one component of the smokable material.

As used herein, the term “smokable material” includes materials that provide volatilized components upon heating, typically in the form of vapor or an aerosol. “Smokable material” may be a non-tobacco-containing material or a tobacco-containing material. “Smokable material” may, for example, include one or more of tobacco per se, tobacco derivatives, expanded tobacco, reconstituted tobacco, tobacco extract, homogenized tobacco or tobacco substitutes. The smokable material can be in the form of ground tobacco, cut rag tobacco, extruded tobacco, liquid, gel, gelled sheet, powder, or agglomerates. “Smokable material” also may include other, non-tobacco, products, which, depending on the product, may or may not contain nicotine. “Smokable material” may comprise one or more humectants, such as glycerol or propylene glycol.

As used herein, the terms “heater material” and “heating material” refers to material that is heatable by penetration with a varying magnetic field.

As used herein, the terms “flavor and flavorant” refer to materials which, where local regulations permit, may be used to create a desired taste or aroma in a product for adult consumers. They may include extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, gel, powder, or the like.

Induction heating is a process in which an electrically-conductive object is heated by penetrating the object with a varying magnetic field. The process is described by Faraday’s law of induction and Ohm’s law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed circuit, magnetic coupling between the susceptor and the electromagnet in use is enhanced, which results in greater or improved Joule heating.

Magnetic hysteresis heating is a process in which an object made of magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, material deposits on the object such as smokable material residue may be less of an issue, design freedom and control over the heating profile may be greater, and cost may be lower.

Referring to FIG. 1 there is shown a schematic perspective view of an example of an article according to an embodiment of the disclosure. The article 1 comprises a container 10 defining a cavity 18 for receiving smokable material 30, and a coil 22 of heating material that is heatable by penetration with a varying magnetic field to heat the cavity 18. That is, the heating material is heatable by penetrating the heating material with a varying magnetic field, and the coil 22 is arranged relative to the cavity 18 so that, when the heating material is penetrated with the varying magnetic field, the heating material heats up and transfers heat energy to the cavity 18 to heat the cavity 18. The article 1 is for use with apparatus for heating smokable material to volatilize at least one component of the smokable material. An example of such apparatus is described below.

In this embodiment, the container 10 comprises a body 12 and an end member 14. In this embodiment, the body 12 is tubular and encircles the cavity 18. In this embodiment, the body 12 is elongate and cylindrical with a substantially circular cross section. However, in other embodiments, the body 12 may have a cross section other than circular and/or not be elongate and/or not be cylindrical. The end member 14 closes a first open end or opening of the tubular body 12. In this embodiment, the end member 14 comprises a plug that is held to the first open end of the tubular body 12, such as by friction or an adhesive. However, in other embodiments the end member 14 may take a different form or be integral with the body 12.

In this embodiment, the article 1 comprises a closed circuit 20 of heating material that is heatable by penetration with a varying magnetic field. Moreover, in this embodiment, the closed circuit 20 comprises the coil 22 and a member 24 of heating material that connects opposite ends of the coil 22 to each other. In other embodiments, the member 24 may be omitted, so that the opposite ends of the coil 22 are connected to each other by only the coil 22 itself. In some embodiments, this can result in magnetic coupling between the coil 22 and the electromagnet in use being enhanced, which results in greater or improved Joule heating.

In this embodiment, the coil 22 is a circular helix. That is, the coil 22 has a substantially constant radius along its length. In other embodiments, the radius of the coil 22 may vary along its length. For example, in some embodiments, the coil 22 may comprise a conic helix or an elliptical helix. In this embodiment, the coil 22 has a substantially constant pitch along its length. That is, a width measured parallel to the longitudinal axis of the coil 22 of a gap between any two adjacent turns of the coil 22 is substantially the same as a width of a gap between any other two adjacent turns of the coil 22. In other embodiments, this may not be true.

In this embodiment, the coil 22 is in a fixed position relative to the cavity 18. In this embodiment, this is effected by the closed circuit 20 being affixed to the end member 14. In some embodiments, the coil 22 may be removable from the article 1, such as for cleaning. Such removability may be provided by way of the coil 22 being detachable from the end member 14, or by way of the combination of the end member 14 and the coil 22 being detachable from the body 12 of the container 10, for example.

In this embodiment, the coil 22 is located in the cavity 18. Therefore, in use, when smokable material 30 is located in the cavity 18, turns of the coil 22 may be surrounded, or substantially surrounded, by the smokable material 30 for effective transfer of heat from the coil 22 to the smokable material 30. That is, the coil 22 may be embedded within the smokable material 30 in use. The coil 22 creates a tortuous flow path through the cavity 18, which may create turbulence in air passing through the cavity 18 so as to help the air to pick up volatilized material created when the smokable material 30 is heated. The coil 22 also has a large surface area per unit longitudinal length, which can result in greater or improved Joule heating of the heating material, and thus greater or improved heating of the smokable material 30. In other embodiments, the coil 22 may be located other than in the cavity 18. For example, the coil 22 may be located within the material of the container 10 itself, in which case the coil 22 would encircle the cavity 18.

In this embodiment, the cavity 18 is elongate, and the coil 22 extends along a longitudinal axis that is substantially aligned with a longitudinal axis A-A of the cavity 18. This can help to provide more uniform heating of the smokable material 30 in use, and can also aid manufacturing of the article 1. In this embodiment, the aligned axes are coincident. In a variation to this embodiment, the aligned axes may be parallel to each other. However, in other embodiments, the axes may be oblique to each other. In some embodiments, the coil 22 may extend to one or both opposite longitudinal ends of the cavity 18. This can help to provide more widespread or yet more uniform heating of the smokable material 30 in use.

The heating material may comprise one or more materials selected from the group consisting of: an electrically-conductive material, a magnetic material, and a non-magnetic material. The heating material may comprise a metal or a metal alloy. The heating material may comprise one or more materials selected from the group consisting of: aluminum, gold, iron, nickel, cobalt, conductive carbon, graphite, plain-carbon steel, stainless steel, ferritic stainless steel, copper, and bronze. Other material(s) may be used in other embodiments. In this embodiment, the heating material of the coil 22 comprises electrically-conductive material. Thus, the heating material is susceptible to eddy currents being induced in the heating material when penetrated by a varying magnetic field. Therefore, the coil 22 is able to act as a susceptor when subjected to the varying magnetic field. It has been found that, when magnetic electrically-conductive material is used as the heating material, magnetic coupling between the coil 22 and coil of the apparatus in use may be enhanced. In addition to potentially enabling magnetic hysteresis heating, this can result in greater or improved Joule heating of the coil 22, and thus greater or improved heating of the smokable material 30.

In some embodiments, the container 10 may be free of material that is heatable by penetration with a varying magnetic field. The container 10 may be made from non-magnetic and non-electrically-conductive material. Such an arrangement can avoid energy of the varying magnetic field being absorbed by the container 10, so that more energy of the varying magnetic field is available to heat the coil 22. In this embodiment, the container 10 is made of glass. In other embodiments, the container 10 may be made of a different material, such as a plastics material. In some embodiments, at least a portion of the container 10 may be transparent or translucent, so as to enable a user to see the contents of the cavity 18. In this embodiment, the body 12 of the container 10 is transparent while the end member 14 is opaque. In other embodiments, the body 12 may be translucent or opaque, for example.

In this embodiment, a first portion 22*a* of the coil 22 is more susceptible to eddy currents being induced therein by penetration with a varying magnetic field than a second portion 22*b* of the coil 22. The first portion 22*a* of the coil 22 may be more susceptible as a result of the first portion 22*a* of the coil 22 being made of a first material, the second portion 22*b* of the coil 22 being made of a different second material, and the first material being of a higher susceptibility to eddy currents being induced therein than the second material. For example, one of the first and second portions 22*a*, 22*b* may be made of iron, and the other of the first and second portions 22*a*, 22*b* may be made of graphite. Alternatively or additionally, the first portion 22*a* of the coil 22 may be more susceptible as a result of the turns of the first portion 22 of the coil 22 having a different thickness and/or material density to the turns of the second portion 22*b* of the coil 22.

The higher susceptibility portion 22*a* may be located closer to an intended mouth end of the article 1, or the lower susceptibility portion 22*b* may be located closer to the intended mouth end of the article 1. In the latter scenario, the lower susceptibility portion 22*b* may heat the smokable material 30 to a lesser degree than the higher susceptibility portion 22*a*, and thus the lesser heated smokable material could act as a filter, to reduce the temperature of created vapor or make the vapor created in the article mild during heating of the smokable material 30.

While in FIG. 1 the first and second portions 22*a*, 22*b* are located adjacent each other in the longitudinal direction of the article 1 or of the coil 22, in other embodiments this need not be the case. For example, in some embodiments the first and second portions 22*a*, 22*b* may be disposed adjacent each other in a direction perpendicular to the longitudinal direction of the article 1 or of the coil 22.

Such varying susceptibility of the coil 22 to eddy currents being induced therein can help achieve progressive heating of the smokable material 30, and thereby progressive generation of vapor. For example, the higher susceptibility portion 22*a* may be able to heat a first region of the smokable material 30 relatively quickly to initialize volatilization of at least one component of the smokable material 30 and formation of a vapor in the first region of the smokable material 30. The lower susceptibility portion 22*b* may be able to heat a second region of the smokable material 30 relatively slowly to initialize volatilization of at least one component of the smokable material 30 and formation of a vapor in the second region of the smokable material 30. Accordingly, a vapor is able to be formed relatively rapidly for inhalation by a user, and vapor can continue to be formed thereafter for subsequent inhalation by the user even after the first region of the smokable material 30 may have ceased generating vapor. The first region of the smokable material 30 may cease generating the vapor when it becomes exhausted of volatilizable components of the smokable material 30.

In other embodiments, all of the coil 22 may be equally, or substantially equally, susceptible to eddy currents being induced therein by penetration with a varying magnetic field. In some embodiments, the coil 22 may not be susceptible to such eddy currents. In such embodiments, the heating material may be a magnetic material that is non-electrically-conductive, and thus may be heatable by the magnetic hysteresis process discussed above.

In some embodiments, the article may comprise a plurality of separate coils 22, wherein each of the coils 22 comprises heating material that is heatable by penetration with a varying magnetic field. At least one of the plurality of coils 22 may be more susceptible to eddy currents being induced therein by penetration with a varying magnetic field than at least one of the other of the plurality of coils 22. This may be effected by the coils 22 being made of different heating materials and/or the turns of the coils 22 having different thicknesses and/or material densities, for example, as discussed above. Again, such varying susceptibility of the coils 22 can help achieve progressive heating of the smokable material 30, and thereby progressive generation of vapor, in a manner corresponding to that described above.

In some embodiments, the article 1 may comprise a catalytic material on at least a portion of the coil 22. The catalytic material may be provided on all of the coil 22, or on only some portion(s) of the coil 22. The catalytic material may take the form of a coating on the coil 22. The provision of such a catalytic material on the coil 22 means that, in use, the article 1 may have a heated, chemically active surface. In use, the catalytic material may act to convert, or increase the rate of conversion of, a potential irritant to something that is less of an irritant. In use, the catalytic material may act to convert, or increase the rate of conversion of, formic acid to methanol, for example. In other embodiments, the catalytic material may act to convert, or increase the rate of conversion of, other chemicals, such as acetylene to ethane by hydrogenation, or ammonia to nitrogen and hydrogen. The catalytic material may additionally or alternatively act to react, or increase the rate of reaction of, carbon monoxide and water vapor to form carbon dioxide and hydrogen (the water-gas shift reaction, or WGSR).

In some embodiments, the article 1 may comprise a coating on the coil 22 that is smoother or harder than a surface of the coil 22 itself. Such a smoother or harder coating may facilitate cleaning of the coil 22 after use of the article 1. The coating could be made of glass or a ceramic material, for example. In other embodiments, the coil 22 may have a rough or non-uniform surface, which can increase the surface area with which the coil 22 contacts the smokable material 30.

In some embodiments, the article 1 may comprise a mass of thermal insulation around the cavity 18. Such a mass may be inside the container 10, outside the container 10, or form the container 10. The thermal insulation may comprise one or more materials selected from the group consisting of: aerogel, vacuum insulation, wadding, fleece, non-woven material, non-woven fleece, woven material, knitted material, nylon, foam, polystyrene, polyester, polyester filament, polypropylene, a blend of polyester and polypropylene, cellulose acetate, paper or card, and corrugated material such as corrugated paper or card. The thermal insulation may additionally or alternatively comprise an air gap. Such thermal insulation can help prevent heat loss to components of the apparatus, and provide more efficient heating of the cavity 18. In some embodiments, the insulation may have a thickness of up to one millimeter, such as up to 0.5 millimeters.

The heating material may have a skin depth, which is an exterior zone within which most of an induced electrical current and/or induced reorientation of magnetic dipoles occurs. By providing that the heating material has a relatively small thickness, a greater proportion of the heating material may be heatable by a given varying magnetic field, as compared to heating material having a depth or thickness that is relatively large as compared to the other dimensions of the heating material. Thus, a more efficient use of material is achieved. In turn, costs are reduced.

Figure 2:
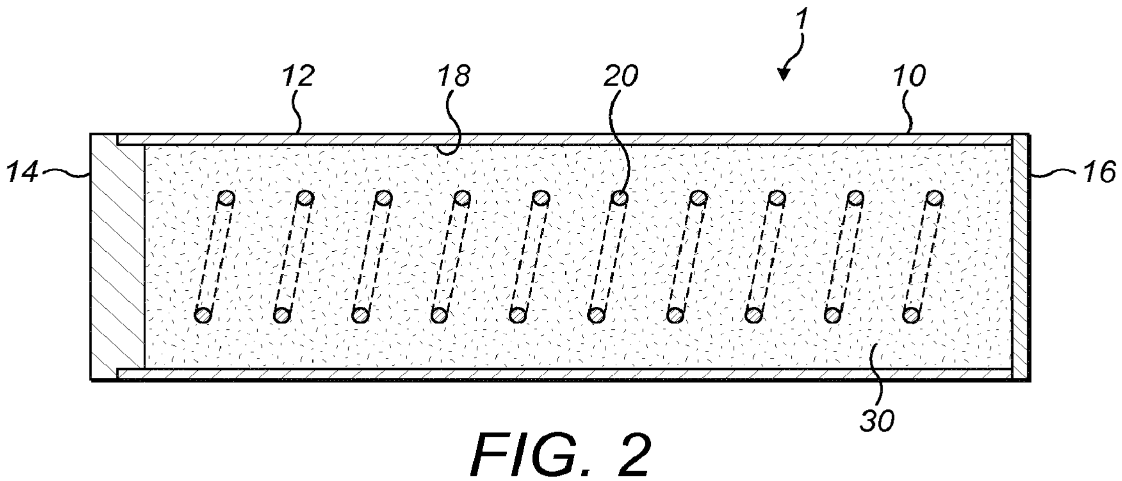
FIG. 2 shows a schematic cross-sectional view of the article of FIG. 1 with smokable material in the cavity and an end closure attached.

Referring to FIG. 2, there is shown a schematic cross-sectional view of the article 1 of FIG. 1 with smokable material 30 in the cavity 18 and an end closure 16 attached to a second open end or opening of the body 10.

In this embodiment, the heating material of the coil 22 is in contact with the smokable material 30. Thus, when the heating material is heated by being penetrated by a varying magnetic field, heat may be transferred directly from the heating material to the smokable material 30. In other embodiments, the heating material may be kept out of contact with the smokable material 30. For example, in some embodiments, the article 1 may comprise a thermally-conductive barrier which spaces the heating material from the smokable material 30. In some embodiments, the thermally-conductive barrier may be a thermally-conductive coating on the coil 22, such as a catalytic coating or a smooth coating as discussed above. The provision of such a thermally-conductive barrier may be advantageous to help to retain heat in the article 1 after heating of the heating material has ceased.

The smokable material 30 could comprise any of the types of smokable materials mentioned herein. The smokable material 30 could be of the form of any of the smokable materials mentioned herein. In some embodiments, the smokable material 30 may comprise a mixture of liquid and powder. The powder could be a suspension in the liquid. The liquid may aid heat retention. The powder may be tobacco powder.

In some embodiments, the end member 14 and the end closure 16 act as respective seals that together seal the cavity 18 from an exterior of the article 1, so as to maintain the freshness of the smokable material 30. In some embodiments, one or both of the end member 14 and the end closure 16 may be openable, puncturable or removable from the article 1 before use, so as to enable air flow through the cavity 18 and thus through the smokable material 30. However, in some embodiments, one or both of the end member 14 and the end closure 16 may comprise an air-permeable membrane or cover for admitting air to pass between the cavity 18 and an exterior of the article 1.

In some embodiments, the article 1 comprises an air-permeable membrane for admitting air into the cavity 18 from an exterior of the article 1, and a seal (such as the end closure 16) between the air-permeable membrane and the exterior of the article 1. The seal seals the air-permeable membrane from the exterior of the article 1 and may be breakable or removable from the article 1 to place the air-permeable membrane, and thus the cavity 18, in fluid communication with the exterior of the article 1. In some embodiments, the article 1 comprises a vapor permeable membrane for permitting vapor generated in the cavity 18 to pass to an exterior of the article 1, and a seal (such as the end member 14) between the vapor permeable membrane and the exterior of the article 1. This seal seals the vapor permeable membrane from the exterior of the article 1 and may be breakable or removable from the article 1 to place the vapor permeable membrane, and thus the cavity 18, in fluid communication with the exterior of the article 1.

In some embodiments, such as some embodiments in which the smokable material comprises a liquid, one or both of the end member 14 and the end closure 16 may comprise a hydrophobic membrane or cover for helping prevent the liquid from escaping from the cavity 18. Indeed, any of the air or vapor permeable membranes discussed herein may comprise a hydrophobic membrane or cover for helping prevent liquid from escaping from the cavity 18.

Figure 3:
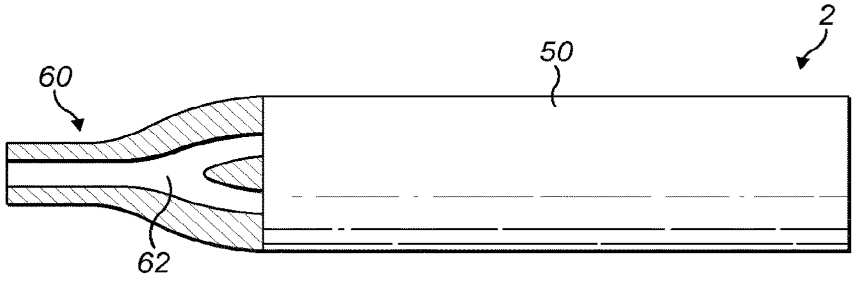
FIG. 3 shows a schematic partial cross-sectional view of an example of another article for use with apparatus for heating smokable material to volatalize at least one component of the smokable material.

In some embodiments, the article may comprise a mouthpiece defining a passageway that is in fluid communication with the cavity 18. Referring to FIG. 3, there is shown a schematic partial cross-sectional view of an example of an article 2 according to an embodiment of the disclosure. The section of the article 2 numbered 50 could comprise either of the constructions shown in FIGS. 1 and 2 or any of the variants thereof discussed above. The mouthpiece 60 and passageway 62 thereof are shown connected to the construction with the passageway 62 aligned so as to be in fluid communication with the cavity 18 of the construction. The mouthpiece 60 may be made of any suitable material, such as a plastics material, cardboard, or rubber.

In use, when the smokable material 30 is heated by the heated heating material, volatilized components of the smokable material 30 can be readily inhaled by a user. In embodiments in which the article is a consumable article, once all or substantially all of the volatilizable component(s) of the smokable material 30 in the article has/have been spent, the user may dispose of the mouthpiece together with the rest of the article. This can be more hygienic than using the same mouthpiece with multiple articles, can help ensure that the mouthpiece is correctly aligned with the smokable material, and presents a user with a clean, fresh mouthpiece each time they wish to use another article.

The mouthpiece 60, when provided, may comprise or be impregnated with a flavorant. The flavorant may be arranged so as to be picked up by heated vapor as the vapor passes through the passageway 62 of the mouthpiece 60 in use.

Figure 4:
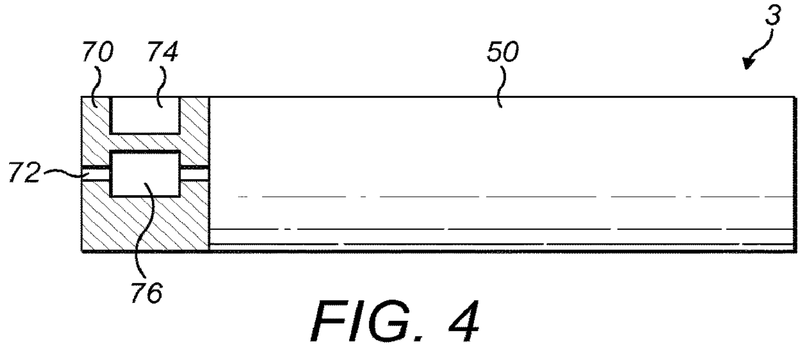
FIG. 4 shows a schematic partial cross-sectional view of an example of another article for use with apparatus for heating smokable material to volatilize at least one component of the smokable material.

In some embodiments, the article may comprise a passageway for fluidly connecting the cavity 18 with an exterior of the article 1, 2, and an actuator operable to vary a cross sectional area of the passageway. Referring to FIG. 4, there is shown a schematic partial cross-sectional view of an example of an article 3 according to an embodiment of the disclosure. The section of the article 3 numbered 50 could comprise any of the constructions shown in FIGS. 1, 2 and 3 or any of the variants thereof discussed above.

In this embodiment, the article 3 comprises an element 70 defining the passageway 72 that fluidly connects the cavity 18 with an exterior of the article 3. The element 70 comprises an actuator 74 that is operable by a user and that is operably connected to a variable constrictor 76. The actuator 74 may comprise, for example, a push-button, a toggle switch, a dial, a touchscreen, or the like. Operation of the actuator 74 by a user causes the variable constrictor 76 to vary a cross sectional area of the passageway 72, so as to change the degree of air flow through the article 3. This can alter the effort required by a user to draw volatilized component(s) of the smokable material 30 from the cavity 18 in use, and can also help a user to retain volatilized component(s) of the smokable material 30 in the cavity 18 between draws.

In some embodiments, the element 70 may be provided at a mouth end, or downstream end, of the cavity 18. In other embodiments, the element 70 may be provided at the end of the cavity 18 opposite to a mouth end of the cavity 18. In some embodiments, the element 70 may be provided at the end of the cavity 18 opposite to an end of the cavity 18 to which a mouthpiece of the article is connected, such as the mouthpiece 60 shown in FIG. 3. In some embodiments, the element 70 may be provided between the cavity 18 and a mouthpiece of the article, such as the mouthpiece 60 shown in FIG. 3. In some embodiments, the element 70 may be combined with a mouthpiece of the article, such as the mouthpiece 60 shown in FIG. 3, so that the passageway of which the cross sectional area is variable is the passageway of the mouthpiece.

Each of the above-described articles 1, 2, 3 and described variants thereof may be used with an apparatus for heating the smokable material 30 to volatilize at least one component of the smokable material 30. The apparatus may be to heat the smokable material 30 to volatilize the at least one component of the smokable material 30 without burning the smokable material 30. Any one of the article(s) 1, 2, 3 and such apparatus may be provided together as a system. The system may take the form of a kit, in which the article 1, 2, 3 is separate from the apparatus. Alternatively, the system may take the form of an assembly, in which the article 1, 2, 3 is combined with the apparatus. An example of such a system will now be described.

Figure 5:
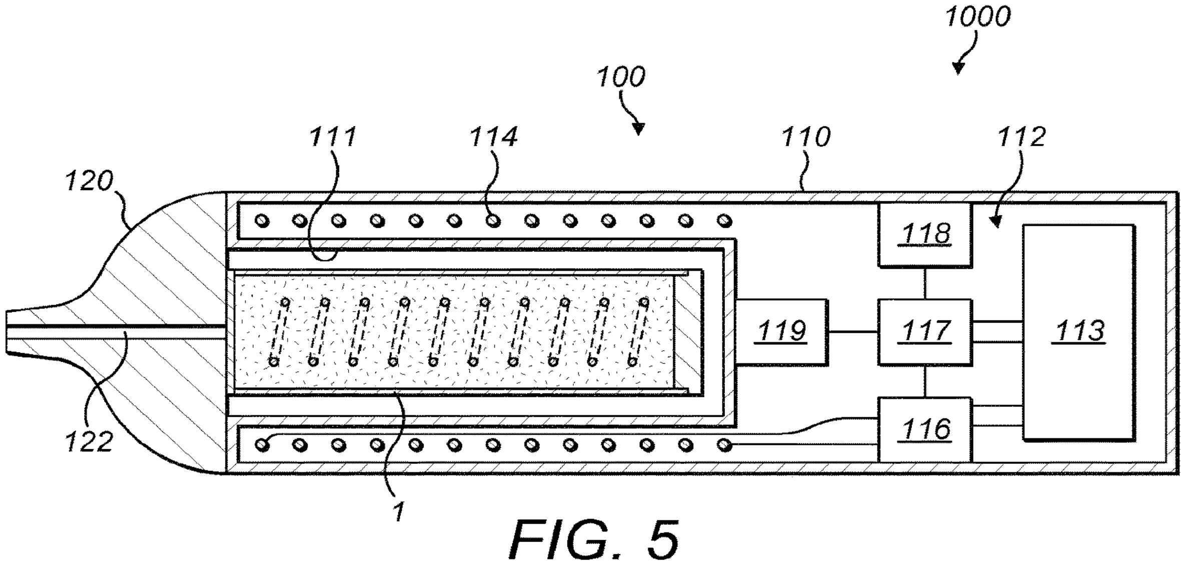
FIG. 5 shows a schematic cross-sectional view of an example of a system comprising the article of FIG. 2 and an apparatus for heating smokable material to volatilize at least one component of the smokable material.

Referring to FIG. 5 there is shown a schematic cross-sectional view of an example of a system according to an embodiment of the disclosure. The system 1000 of this embodiment comprises the article 1 of FIG. 2 and apparatus 100 for heating the smokable material 30 in the article 2 to volatilize at least one component of the smokable material 30. Broadly speaking, the apparatus 100 comprises an interface 111 for cooperating with the article 2, and a magnetic field generator 112 comprising a coil 114 for generating a varying magnetic field for penetrating the coil 22 of the article 2 when the interface 111 is cooperating with the article 2.

The apparatus 100 of this embodiment comprises a body 110 and a mouthpiece 120. The mouthpiece 120 defines a channel 122 therethrough. The mouthpiece 120 is locatable relative to the body 110 so as to cover an opening into the recess 111. When the mouthpiece 120 is so located relative to the body 110, the channel 122 of the mouthpiece 120 is in fluid communication with the recess 111. In use, the channel 122 acts as a passageway for permitting volatilized material to pass from the cavity 18 of the article 2 inserted in the recess 111 to an exterior of the apparatus 100. In this embodiment, the mouthpiece 120 of the apparatus 100 is releasably engageable with the body 110 so as to connect the mouthpiece 120 to the body 110. In other embodiments, the mouthpiece 120 and the body 110 may be permanently connected, such as through a hinge or flexible member. The mouthpiece 120 of the apparatus 100 may comprise or be impregnated with a flavorant. The flavorant may be arranged so as to be picked up by heated vapor as the vapor passes through the channel 122 of the mouthpiece 120 in use. In some embodiments, such as some embodiments in which the article 2 itself comprises a mouthpiece, the mouthpiece 120 of the apparatus 100 may be omitted.

In this embodiment, the body 110 comprises the interface 111. In this embodiment, the interface 111 comprises a recess 111 for receiving at least a portion of the article 2. In other embodiments, the interface 111 may be other than a recess, such as a shelf, a surface, or a projection, and may require mechanical mating with the article 1, 2, 3 in order to co-operate with the article 1, 2, 3. In this embodiment, the recess 111 is elongate, and is sized and shaped to receive the article 2. In this embodiment, the recess 111 accommodates the whole article 2. In other embodiments, the recess 111 may receive only a portion of the article 2.

In this embodiment, the magnetic field generator 112 comprises an electrical power source 113, the coil 114, a device 116 for passing a varying electrical current, such as an alternating current, through the coil 114, a controller 117, and a user interface 118 for user-operation of the controller 117.

In this embodiment, the electrical power source 113 is a rechargeable battery. In other embodiments, the electrical power source 113 may be other than a rechargeable battery, such as a non-rechargeable battery, a capacitor or a connection to a mains electricity supply.

The coil 114 may take any suitable form. In this embodiment, the coil 114 is a helical coil of electrically-conductive material, such as copper. In some embodiments, the magnetic field generator 112 may comprise a magnetically permeable core around which the coil 114 is wound. Such a magnetically permeable core concentrates the magnetic flux produced by the coil 114 in use and makes a more powerful magnetic field. The magnetically permeable core may be made of iron, for example. In some embodiments, the magnetically permeable core may extend only partially along the length of the coil 114, so as to concentrate the magnetic flux only in certain regions.

In this embodiment, the coil 114 of the magnetic field generator 112 extends along a longitudinal axis that is substantially coincident with a longitudinal axis of the recess 111. In other embodiments, these axes may be aligned with each other by being parallel to each other, or may be oblique to each other. In this embodiment, when the article 2 is received in the recess 111, as shown in FIG. 5, the longitudinal axis of the recess 111 is substantially coincident with the longitudinal axis of the cavity 18 of the article 2.

In this embodiment, an impedance of the coil 114 of the magnetic field generator 112 is equal, or substantially equal, to an impedance of the coil 22 of the article 2. If the impedance of the coil 22 of the article 2 were instead lower than the impedance of the coil 114 of the magnetic field generator 112, then the voltage generated across the coil 22 of the article 2 in use may be lower than the voltage that may be generated across the coil 22 of the article 2 when the impedances are matched. Alternatively, if the impedance of the coil 22 of the article 2 were instead higher than the impedance of the coil 114 of the magnetic field generator 112, then the electrical current generated in the coil 22 of the article 2 in use may be lower than the current that may be generated in the coil 22 of the article 2 when the impedances are matched. Matching the impedances may help to balance the voltage and current to maximize the heating power generated at the coil 22 of the article 2 when heated in use.

While the system 1000 of this embodiment comprises the article 2 of FIG. 2, in other embodiments the system may comprise any other one of the articles discussed above. In such other embodiments, the impedance of the coil 114 of the magnetic field generator 112 may be equal, or substantially equal, to an impedance of the coil of the article.

In this embodiment, the device 116 for passing a varying current through the coil 114 is electrically connected between the electrical power source 113 and the coil 114. In this embodiment, the controller 117 also is electrically connected to the electrical power source 113, and is communicatively connected to the device 116 to control the device 116. More specifically, in this embodiment, the controller 117 is for controlling the device 116, so as to control the supply of electrical power from the electrical power source 113 to the coil 114. In this embodiment, the controller 117 comprises an integrated circuit (IC), such as an IC on a printed circuit board (PCB). In other embodiments, the controller 117 may take a different form. In some embodiments, the apparatus may have a single electrical or electronic component comprising the device 116 and the controller 117. The controller 117 is operated in this embodiment by user-operation of the user interface 118. The user interface 118 is located at the exterior of the body 110. The user interface 118 may comprise a push-button, a toggle switch, a dial, a touchscreen, or the like.

In this embodiment, operation of the user interface 118 by a user causes the controller 117 to cause the device 116 to cause an alternating electrical current to pass through the coil 114, so as to cause the coil 114 to generate an alternating magnetic field. When the article 2 is located in the recess 111, the coil 114 of the apparatus 100 and the coil 22 of the article 2 are suitably relatively positioned so that the alternating magnetic field produced by the coil 114 penetrates the heating material of the coil 22 of the article 2. When the heating material of the coil 22 is an electrically-conductive material, this may cause the generation of one or more eddy currents in the heating material. The flow of eddy currents in the heating material against the electrical resistance of the heating material causes the heating material to be heated by Joule heating. As mentioned above, when the heating material is made of a magnetic material, the orientation of magnetic dipoles in the heating material changes with the changing applied magnetic field, which causes heat to be generated in the heating material.

The apparatus 100 of this embodiment comprises a temperature sensor 119 for sensing a temperature of the recess 111. The temperature sensor 119 is communicatively connected to the controller 117, so that the controller 117 is able to monitor the temperature of the recess 111. In some embodiments, the temperature sensor 119 may be arranged to take an optical temperature measurement of the recess, interface or article 1, 2, 3. In some embodiments, the article 1, 2, 3 may comprise a temperature detector, such as a resistance temperature detector (RTD), for detecting a temperature of the article 1, 2, 3. For example, the temperature detector may be located in or on the container 10 of the article 1, 2, 3. The article 1, 2, 3 may further comprise one or more terminals connected, such as electrically-connected, to the temperature detector. The terminal(s) may be for making connection, such as electrical connection, with a temperature monitor of the apparatus 100 when the article 1, 2, 3 is in the recess 111 or cooperating with the interface. The controller 117 may comprise the temperature monitor. The temperature monitor of the apparatus 100 may thus be able to determine a temperature of the article 1, 2, 3 during use of the article 1, 2, 3 with the apparatus 100.

In some embodiments, by providing that the heating material of the coil 22 of the article 2 has a suitable resistance, the response of the heating material to a change in temperature could be sufficient to give information regarding temperature inside the article 2. The temperature sensor 119 of the apparatus 100 may then comprise a probe for analyzing the heating material.

On the basis of one or more signals received from the temperature sensor 119 or temperature detector, the controller 117 may cause the device 116 to adjust a characteristic of the varying or alternating electrical current passed through the coil 114 as necessary, in order to ensure that the temperature of the recess 111 remains within a predetermined temperature range. The characteristic may be, for example, amplitude or frequency. Within the predetermined temperature range, in use the smokable material 30 within an article 1, 2, 3 located in the recess 111 is heated sufficiently to volatalize at least one component of the smokable material 30 without combusting the smokable material 30. Accordingly, the controller 117, and the apparatus 100 as a whole, is arranged to heat the smokable material 30 to volatalize the at least one component of the smokable material 30 without combusting the smokable material 30. In some embodiments, the temperature range is about 50° C. to about 250° C., such as between about 50° C. and about 150° C., between about 50° C. and about 120° C., between about 50° C. and about 100° C., between about 50° C. and about 80° C., or between about 60° C. and about 70° C. In some embodiments, the temperature range is between about 170° C. and about 220° C. In other embodiments, the temperature range may be other than this range.

The apparatus 100 may define an air inlet that fluidly connects the recess 111 with the exterior of the apparatus 100. Such an air inlet may be defined by the body 110 of the apparatus 100 and/or by the mouthpiece 120 of the apparatus 100. A user may be able to inhale the volatalized component (s) of the smokable material 30 by drawing the volatalized component(s) through the channel 122 of the mouthpiece 120. As the volatalized component(s) are removed from the cavity 18 of the container 10 of the article 2, air may be drawn into the recess 111 via the air inlet of the apparatus 100. Furthermore, in embodiments in which the end member 14 and/or end closure 16 of the container 10 of the article 2 is/are puncturable, the air may be drawn into the cavity 18 of the container 10 via one or both of the punctured end member 14 and end closure 16. Alternatively, in embodiments in which the article 2 comprises an air-permeable membrane for admitting air into the cavity 18 from the exterior of the article 2, a vapor permeable membrane for permitting vapor generated in the cavity 18 to pass to the exterior of the article 2, and first and second seals between the exterior of the article 2 and the air-permeable membrane and the vapor permeable membrane, respectively, a user may break or remove the first and second seals prior to use of the apparatus 100 and article 2 to enable air to be drawn into the cavity 18 via the air-permeable membrane, and vapor generated in the cavity 18 to pass to the channel 122 of the mouthpiece 120 via the vapor permeable membrane.

The apparatus may provide haptic feedback to a user. The feedback could indicate that heating is taking place, or be triggered by a timer to indicate that greater than a predetermined proportion of the original quantity of volatilizable component(s) of the smokable material 30 in the article 1, 2, 3 has/have been spent, or the like. The haptic feedback could be created by interaction of the coils (i.e. magnetic response), by interaction of an electrically-conductive element with the coil 114 of the apparatus 100, by rotating an unbalanced motor, by repeatedly applying and removing a current across a piezoelectric element, or the like.

The apparatus 100 may comprise more than one coil. The plurality of coils of the apparatus 100 could be operable to provide progressive heating of the smokable material 30 in an article 1, 2, 3, and thereby progressive generation of vapor. For example, one coil may be able to heat a first region of the heating material relatively quickly to initialize volatilization of at least one component of the smokable material 30 and formation of a vapor in a first region of the smokable material 30. Another coil may be able to heat a second region of the heating material relatively slowly to initialize volatilization of at least one component of the smokable material 30 and formation of a vapor in a second region of the smokable material 30. Accordingly, a vapor is able to be formed relatively rapidly for inhalation by a user, and vapor can continue to be formed thereafter for subsequent inhalation by the user even after the first region of the smokable material 30 may have ceased generating vapor. The initially-unheated second region of smokable material 30 could act as a filter, to reduce the temperature of created vapor or make the created vapor mild, during heating of the first region of smokable material 30.

In some embodiments, the coil of the article is a first coil, and the article may comprise a second coil of heating material that is heatable by penetration with a varying magnetic field to heat the cavity 18 of the article. The first and second coils of the article may be substantially separately heatable by varying magnetic fields produced by a respective plurality of coils of the apparatus 100. One of the first and second coils may be more susceptible to eddy currents being induced therein by penetration with a varying magnetic field than the other of the first and second coils. Such a structure could be operable to provide progressive heating of the smokable material 30 in the article, and thereby progressive generation of vapor, in a similar way to that described above.

In some embodiments, the heating material of the coil 22 may comprise discontinuities or holes therein. Such discontinuities or holes may act as thermal breaks to control the degree to which different regions of the smokable material are heated in use. Areas of the heating material with discontinuities or holes therein may be heated to a lesser extent that areas without discontinuities or holes. This may help progressive heating of the smokable material, and thus progressive generation of vapor, to be achieved.

In each of the above described embodiments, the smokable material 30 comprises tobacco. However, in respective variations to each of these embodiments, the smokable material 30 may consist of tobacco, may consist substantially entirely of tobacco, may comprise tobacco and smokable material other than tobacco, may comprise smokable material other than tobacco, or may be free of tobacco. In some embodiments, the smokable material 30 may comprise a vapor or aerosol forming agent or a humectant, such as glycerol, propylene glycol, triactein, or diethylene glycol.

An article embodying the present disclosure may be a cartridge or a capsule, for example. Each of the above described articles 1, 2, 3 may be used as a consumable article. Once all, or substantially all, of the volatilizable component(s) of the smokable material 30 in the article 1, 2, 3 has/have been spent, the user may remove the article 1, 2, 3 from the apparatus 100 and dispose of the article 1, 2, 3. The user may subsequently re-use the apparatus 100 with another of the articles 1, 2, 3. However, in other embodiments, the articles 1, 2, 3 may be refillable with smokable material 30 and re-usable with the apparatus 100. Such re-filling may be effected by detaching the end closure 16 from the body 12 of the container 10 to access the cavity 18, removing the remains of smokable material used in a previous session, placing a new charge of smokable material in the cavity 18, and then placing an end closure 16 (either the original end closure 16 or a new end closure 16) over the second open end of the body 12 of the container 10. During such re-filling, the coil 22 may be removable, for example for cleaning or for replacement with a fresh coil 22.

Each of the above described articles 1, 2, 3 may be supplied with or without the smokable material 30 in the cavity 18.

In some embodiments, the articles 1, 2, 3 discussed above are sold, supplied or otherwise provided separately from the apparatus 100 with which they are usable. However, in some embodiments, the apparatus and one or more of the articles 1, 2, 3 may be provided together as a system, such as a kit or an assembly, possibly with additional components, such as cleaning utensils.

Embodiments of the disclosure could be implemented in a system comprising any one of the articles discussed herein, and any one of the apparatuses discussed herein, wherein the apparatus itself further has heating material, such as in a susceptor, for heating by penetration with the varying magnetic field generated by the magnetic field generator. Heat generated in the heating material of the apparatus itself could be transferred to the article to further heat the smokable material therein.

In order to address various issues and advance the art, the entirety of this disclosure shows by way of illustration and example various embodiments in which the claimed invention may be practiced and which provide for superior articles for use with apparatus for heating smokable material to volatalize at least one component of the smokable material, and superior systems comprising the same. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. An article for use with an apparatus configured to heat smokable material to volatilize at least one component of the smokable material, the article comprising:

a cavity configured to receive the smokable material; and a heater material that is heatable via penetration with a varying magnetic field and to thereby heat the cavity, wherein the heater material comprises a first region with discontinuities or holes therein and a second region without discontinuities or holes;

wherein the first region of the heater material extends along a first portion of the cavity and the second region of the heater material extends along a second, different portion of the cavity; and wherein the discontinuities or holes control the degree to which different regions of the smokable material are heated in use.

2. The article of claim 1, further comprising a closed circuit of heater material that is heatable via penetration with the varying magnetic field, wherein the closed circuit includes the heater material.

3. The article of claim 1, wherein the heater material is disposed in the cavity.

4. The article of claim 1, wherein the cavity is elongate, and wherein the heater material extends along a longitudinal axis that is substantially aligned with a longitudinal axis of the cavity.

5. The article of claim 1, wherein the heater material comprises one or more materials selected from the group consisting of: an electrically-conductive material, a magnetic material, and a non-magnetic material.

6. The article of claim 1, wherein the heater material comprises a metal or a metal alloy.

7. The article of claim 1, wherein the heater material comprises one or more materials selected from the group consisting of: aluminum, gold, iron, nickel, cobalt, conductive carbon, graphite, plain-carbon steel, stainless steel, ferritic stainless steel, copper, and bronze.

8. The article of claim 1, wherein the heater material is susceptible to eddy currents induced in the heater material when penetrated by the varying magnetic field.

9. The article of claim 1, wherein a first portion of the heater material is more susceptible to eddy currents induced therein by penetration with the varying magnetic field than a second portion of the heater material.

10. The article of claim 1, further comprising a container that defines the cavity, wherein the container is free of material that is heatable by penetration with the varying magnetic field.

11. The article of claim 1, further comprising the smokable material received in the cavity.

12. The article of claim 11, wherein the heater material is in contact with the smokable material.

13. The article of claim 11, wherein the smokable material includes at least one of tobacco or one or more humectants.

14. The article of claim 1, further comprising a mouthpiece that defines a passageway that is in fluid communication with the cavity.

15. The article of claim 1, wherein the cavity is sealed from an exterior of the article.

16. The article of claim 1, further comprising an air-permeable membrane configured to admit air into the cavity from an exterior of the article during use.

17. The article of claim 16, further comprising a seal disposed between the air-permeable membrane and the exterior of the article, wherein the seal seals the air-permeable membrane from the exterior of the article, and the seal is breakable or removable from the article so as to place the air-permeable membrane in fluid communication with the exterior of the article during use.

18. A system, comprising:

the article as claimed in claim 1; and an apparatus having an interface configured to cooperate with the article, and a magnetic field generator having a coil configured to generate the varying magnetic field that penetrates the heater material of the article when the interface is cooperating with the article.

19. The system of claim 18, wherein the interface defines a recess configured to receive at least a portion of the article.

20. The system of claim 19, wherein the recess is elongate, and wherein the coil of the magnetic field generator extends along a longitudinal axis that is substantially aligned with a longitudinal axis of the recess.

* * * * *